(12) United States Patent
Islam et al.

(10) Patent No.: US 11,683,208 B2
(45) Date of Patent: Jun. 20, 2023

(54) DIFFERENT NUMEROLOGY FOR SIGNAL TRANSMISSION

(71) Applicant: QUALCOMM Incorporated, San Diego, CA (US)

(72) Inventors: Muhammad Nazmul Islam, Littleton, MA (US); Tao Luo, San Diego, CA (US); Sundar Subramanian, San Diego, CA (US); Navid Abedini, Somerset, NJ (US); Junyi Li, Chester, NJ (US); Juergen Cezanne, Ocean Township, NJ (US); Hung Dinh Ly, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/840,040

(22) Filed: Apr. 3, 2020

(65) Prior Publication Data
US 2020/0236675 A1   Jul. 23, 2020

Related U.S. Application Data

(63) Continuation of application No. 15/454,535, filed on Mar. 9, 2017, now Pat. No. 10,638,474.
(Continued)

(51) Int. Cl.
*H04L 27/26* (2006.01)
*H04W 72/04* (2023.01)
(Continued)

(52) U.S. Cl.
CPC ........ *H04L 27/26025* (2021.01); *H04L 5/003* (2013.01); *H04L 5/0007* (2013.01);
(Continued)

(58) Field of Classification Search
CPC .......... H04W 72/042; H04W 74/0833; H04W 72/0453; H04W 72/0446; H04W 56/001;
(Continued)

(56) References Cited

U.S. PATENT DOCUMENTS 7,991,079 B2   8/2011   Mujtaba
8,902,864 B2   12/2014  Laroia et al.
(Continued)

FOREIGN PATENT DOCUMENTS

CN   101640841 A   2/2010
CN   101981870 A   2/2011
(Continued)

OTHER PUBLICATIONS

Huawei et al.,"Discussion on UE behavior mixed numerology carrier", 3GPP TSG RAN WG1 Meeting #86bis, R1-1609425, Lisbon , Portugal, Oct. 10-14, 2016, 4 Pages.
(Continued)

*Primary Examiner* — Jae Y Lee
*Assistant Examiner* — Aixa A Guadalupe Cruz
(74) *Attorney, Agent, or Firm* — Holland & Hart / Qualcomm

(57) ABSTRACT

Methods, systems, and devices for wireless communication are described. Methods, systems, and devices provide for different tone spacing schemes for different channels. Methods, systems, and devices also provide for different tone spacing schemes for different stages of communication between a UE and a base station. The base station may indicate, to the UE, the tone spacing scheme in a control channel, a synchronization signal, or a reference signal and the tone spacing scheme may be selected by the base station from available tone spacing schemes for communication. Tone spacing schemes may also be referred to as numerologies.

48 Claims, 17 Drawing Sheets

Related U.S. Application Data

(60) Provisional application No. 62/343,826, filed on May 31, 2016, provisional application No. 62/325,726, filed on Apr. 21, 2016.

(51) Int. Cl.
*H04L 5/00* (2006.01)
*H04W 56/00* (2009.01)
*H04W 72/0446* (2023.01)
*H04W 74/08* (2009.01)

(52) U.S. Cl.
CPC ........ *H04L 5/0091* (2013.01); *H04L 27/2646* (2013.01); *H04L 27/2666* (2013.01); *H04W 56/0015* (2013.01); *H04W 72/0446* (2013.01); *H04W 74/0833* (2013.01)

(58) Field of Classification Search
CPC ... H04W 72/02; H04W 74/006; H04W 72/04; H04W 74/0866; H04W 16/00; H04W 16/14; H04W 74/002; H04W 74/004; H04W 74/08; H04W 72/0493; H04W 72/12; H04W 72/1289; H04W 72/14; H04W 74/0891; H04L 5/0012
See application file for complete search history.

(56) References Cited

U.S. PATENT DOCUMENTS

| | | | |
|---|---|---|---|
| 11,212,147 B2 * | 12/2021 | Ma | H04L 5/001 |
| 2006/0083211 A1 | 4/2006 | Laroia et al. | |
| 2008/0205351 A1 | 8/2008 | Lindoff et al. | |
| 2010/0149961 A1 | 6/2010 | Lee et al. | |
| 2015/0180622 A1 | 6/2015 | Yoo et al. | |
| 2016/0135185 A1 | 5/2016 | Chandrasekhar et al. | |
| 2016/0352551 A1 | 12/2016 | Zhang et al. | |
| 2017/0094547 A1 | 3/2017 | Yum et al. | |
| 2017/0111930 A1 | 4/2017 | Rajagopal et al. | |
| 2017/0290008 A1 | 10/2017 | Tooher et al. | |
| 2017/0311276 A1 * | 10/2017 | Tsai | H04W 56/001 |
| 2017/0311315 A1 | 10/2017 | Islam et al. | |
| 2017/0325256 A1 | 11/2017 | Islam et al. | |
| 2018/0007673 A1 * | 1/2018 | Fwu | H04L 5/0092 |
| 2018/0110019 A1 * | 4/2018 | Ly | H04W 56/001 |
| 2019/0029003 A1 * | 1/2019 | Takeda | H04W 72/04 |
| 2019/0109695 A1 * | 4/2019 | Kim | H04L 27/2613 |
| 2019/0132172 A1 * | 5/2019 | Saito | H04L 5/0094 |
| 2020/0314908 A1 * | 10/2020 | Hwang | H04W 74/0833 |

FOREIGN PATENT DOCUMENTS

| | | |
|---|---|---|
| KR | 20080089728 A | 10/2008 |
| WO | WO2009084931 A1 | 7/2009 |
| WO | WO2015001369 A1 | 1/2015 |
| WO | WO2016004634 A1 | 1/2016 |
| WO | WO2016040290 A1 | 3/2016 |
| WO | WO-2017184837 A1 | 10/2017 |

OTHER PUBLICATIONS

Huawei et al.,"Remaining NB-IoT random access physical layer aspects", 3GPP TSG RAN WG1 Meeting #84, R1 -160327, St Julian's, Malta, Feb. 15-19, 2016, 4 Pages.

Mediatek et al.,"WF on Configuration of UL Spacing Subcarrier", 3GPP TSG RAN WG1 Meeting #84, R1-161450, St Julian's, Malta, Feb. 15-19, 2016, 2 Pages.

Samsung: "Numerology configuration in NR" [online], 3GPP TSG RAN WG2 #97bis, R2-1703330, Apr. 7, 2017, 7 Pages, URL:http://www.3gpp.org/ftp/tsg_ran/WG2_RL2/TSGR2_97bis/Docs/R2-1703330.zip.

"3rd Generation Partnership Project; Technical Specification Group Radio Access Network; Evolved Universal Terrestrial Radio Access (E-UTRA); Physical Channels and Modulation (Release 12)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V12.8.0, XP051047400, Dec. 8, 2015 (Dec. 8, 2015), pp. 1-136, [retrieved on Dec. 8, 2015].

ETRI 8.1.6, "Band agnostic synchronization and cell search," R1-166949, 3GPP TSG RAN WG1 Meeting #86, Gothenburg, Sweden, Aug. 22-26, 2016, pp. 1-3.

International Preliminary Report on Patentability—PCT/US2017/026147, The International Bureau of WIPO—Geneva, Switzerland, dated Jul. 30, 2018.

International Search Report and Written Opinion—PCT/US2017/026147—ISA/EPO—dated Sep. 7, 2017.

IPEA/EP, Second Written Opinion of the International Preliminary Examining Authority, Int'l Application No. PCT/US2017/026147, dated Apr. 20, 2018, European Patent Office, Rijswijk, NL, 13 pgs.

Mediatek Inc: "Consideration on Synchronization Channel Design for NB IoT," 3GPP TSG RAN WG1 Meeting #82bis, R1-155894, Malmo, Sweden, Oct. 5-9, 2015, 4 Pages, XP051039772, Oct. 4, 2015 (Oct. 4, 2015).

Partial International Search Report—PCT/US2017/026147—ISA/EPO—dated Jul. 7, 2017.

Taiwan Search Report—TW106111353—TIPO—dated Jul. 29, 2020.

* cited by examiner

DIFFERENT NUMEROLOGY FOR SIGNAL TRANSMISSION

CROSS REFERENCES

The present Application for Patent is a Continuation of U.S. patent application Ser. No. 15/454,535 by Islam, et al., entitled "Different Numerology For Signal Transmission" filed Mar. 9, 2017, which claims priority to U.S. Provisional Patent Application No. 62/325,726 by Ly, et al., entitled "Unified Synchronization Signals," filed Apr. 21, 2016, assigned to the assignee hereof, and to U.S. Provisional Patent Application No. 62/343,826 by Islam, et al., entitled "Different Numerology For Signal Transmission," filed May 31, 2016, also assigned to the assignee hereof.

BACKGROUND

The following relates generally to wireless communication, and more specifically to different numerology for signal transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A UE and a base station may utilize time and frequency resources for communication. The time and frequency resources may be dedicated for communication between the base station and the UE or may be shared by multiple base stations and/or multiple UEs.

SUMMARY

The described techniques relate to improved methods, systems, devices, or apparatuses that support different numerology for signal transmission. Generally, the described techniques provide for tone spacing schemes to be utilized during communication between a base station and a user equipment (UE) in a wireless network. Tone spacing schemes may differ from each other in tone spacing or symbol duration and may be selected from tone spacing schemes available for use in the wireless network. A tone spacing scheme for a wireless network may also be referred to as a numerology for the wireless network and may encompass tone spacing (i.e., the bandwidth between each tone or subcarrier in the frequency domain), symbol duration (i.e., the time interval designated as a single time resource), number of tones within a carrier (i.e., the number of subcarriers spanning a given component carrier for wireless communication), the number of symbols spanning a frame, subframe, slot, mini-slot, or any other time interval of the wireless network, etc.

In some cases, UEs and base stations in a multiple-access communications system may support different tone spacing schemes when communicating using different channels or at different stages of communication. For example, a UE and a base station may communicate using one tone spacing scheme during a random access channel (RACH) procedure, but may use a different tone spacing scheme for data communications. The tone spacing scheme may be identified by a base station and an indication of the tone spacing scheme may be transmitted to a UE using a control channel, a synchronization signal, or a reference signal, among others. Alternatively, a tone spacing scheme may indicate a number of different tone spacings that may be applied to different stages of communication or different types of communication channels. Thus, a tone spacing scheme may include a tone spacing for communications on a first stage of communications and a different tone spacing for communications on a second stage of communications. As another example, a tone spacing scheme may include a tone spacing for a first type of communication channel and a different tone spacing for a second type of communication channel.

A method of wireless communications is described. The method may include identifying a tone spacing scheme that includes different tone spacings for wireless communications within a wireless network, the tone spacing scheme indicating different tone spacings for combinations of uplink communications, downlink communications, or sidelink communications and communicating with a wireless device according to the identified tone spacing scheme.

An apparatus for wireless communications is described. The apparatus may include means for identifying a tone spacing scheme that includes different tone spacings for wireless communications within a wireless network, the tone spacing scheme indicating different tone spacings for combinations of uplink communications, downlink communications, or sidelink communications and means for communicating with a wireless device according to the identified tone spacing scheme.

Another apparatus for wireless communications is described. The apparatus may include a processor, memory in electronic communication with the processor, and instructions stored in the memory. The instructions may be operable to cause the processor to identify a tone spacing scheme that includes different tone spacings for wireless communications within a wireless network, the tone spacing scheme indicating different tone spacings for combinations of uplink communications, downlink communications, or sidelink communications and communicate with a wireless device according to the identified tone spacing scheme.

A non-transitory computer readable medium for wireless communications is described. The non-transitory computer-readable medium may include instructions operable to cause a processor to identify a tone spacing scheme that includes different tone spacings for wireless communications within a wireless network, the tone spacing scheme indicating different tone spacings for combinations of uplink communications, downlink communications, or sidelink communications and communicate with a wireless device according to the identified tone spacing scheme.

Some examples of the method, apparatus, and non-transitory computer-readable medium described above may further include processes, features, means, or instructions for selecting the tone spacing scheme from a plurality of available tone spacing schemes.

In some examples of the method, apparatus, and non-transitory computer-readable medium described above, communicating with the wireless device comprises: using one or more different tone spacings for each stage of different stages of wireless communications in accordance with the identified tone spacing scheme.

In some examples of the method, apparatus, and non-transitory computer-readable medium described above, communicating with the wireless device comprises: participating in a RACH procedure with the wireless device in accordance with the identified tone spacing scheme, wherein a tone spacing for the RACH procedure may be different from a tone spacing for other stages of communication with the wireless device.

In some examples of the method, apparatus, and non-transitory computer-readable medium described above, communicating with the wireless device comprises: participating in data communications with the wireless device in accordance with the identified tone spacing scheme, wherein a tone spacing for the data communications may be different from a tone spacing for other stages of communication with the wireless device.

In some examples of the method, apparatus, and non-transitory computer-readable medium described above, communicating with the wireless device comprises: communicating with the wireless device using one or more different tone spacings for each type of different wireless communication channel types in accordance with the identified tone spacing scheme.

In some examples of the method, apparatus, and non-transitory computer-readable medium described above, communicating with the wireless device comprises: communicating via one or more control channels with the wireless device in accordance with the identified tone spacing scheme, wherein a tone spacing for the one or more control channels may be different from a tone spacing for other types of communication with the wireless device.

In some examples of the method, apparatus, and non-transitory computer-readable medium described above, the tone spacing of at least one synchronization signal may be different from at least one other synchronization signal.

In some examples of the method, apparatus, and non-transitory computer-readable medium described above, the tone spacing of at least one synchronization signal may be different from other channels of communication.

In some examples of the method, apparatus, and non-transitory computer-readable medium described above, the at least one synchronization signal comprises a primary synchronization signal (PSS), a secondary synchronization signal (SSS), a physical broadcast channel (PBCH), or combinations thereof.

In some examples of the method, apparatus, and non-transitory computer-readable medium described above, communicating with the wireless device comprises: including an indication of the identified tone spacing scheme via a synchronization channel, a control channel a physical broadcast channel (PBCH), a radio resource control (RRC) message, master information block, a system information block, or combinations thereof.

In some examples of the method, apparatus, and non-transitory computer-readable medium described above, the system information block comprises minimum system information or other system information.

In some examples of the method, apparatus, and non-transitory computer-readable medium described above, communicating with the wireless device comprises: indicating the identified tone spacing scheme via a characteristic of a primary synchronization signal (PSS), a secondary synchronization signal (SSS), or a reference signal. In some examples, the characteristic comprises a number of repetitions, a number of tones, a pattern of tones, or combinations thereof In some examples of the method, apparatus, and non-transitory computer-readable medium described above, communicating with the wireless device comprises: indicating the identified tone spacing scheme for either a current subframe or a future subframe.

A method of wireless communications is described. The method may include identifying a tone spacing scheme that includes different tone spacings for wireless communications within a wireless network, the tone spacing scheme indicating tone spacing for a current subframe, a future subframe, or a combination thereof and communicating with a wireless device according to the identified tone spacing scheme.

An apparatus for wireless communications is described. The apparatus may include means for identifying a tone spacing scheme that includes different tone spacings for wireless communications within a wireless network, the tone spacing scheme indicating tone spacing for a current subframe, a future subframe, or a combination thereof and means for communicating with a wireless device according to the identified tone spacing scheme.

Another apparatus for wireless communications is described. The apparatus may include a processor, memory in electronic communication with the processor, and instructions stored in the memory. The instructions may be operable to cause the processor to identify a tone spacing scheme that includes different tone spacings for wireless communications within a wireless network, the tone spacing scheme indicating tone spacing for a current subframe, a future subframe, or a combination thereof and communicate with a wireless device according to the identified tone spacing scheme.

A non-transitory computer readable medium for wireless communications is described. The non-transitory computer-readable medium may include instructions operable to cause a processor to identify a tone spacing scheme that includes different tone spacings for wireless communications within a wireless network, the tone spacing scheme indicating tone spacing for a current subframe, a future subframe, or a combination thereof and communicate with a wireless device according to the identified tone spacing scheme.

Some examples of the method, apparatus, and non-transitory computer-readable medium described above may further include processes, features, means, or instructions for selecting the tone spacing scheme from a plurality of available tone spacing schemes.

In some examples of the method, apparatus, and non-transitory computer-readable medium described above, communicating with the wireless device comprises: using one or more different tone spacings for each stage of different stages of wireless communications in accordance with the identified tone spacing scheme.

In some examples of the method, apparatus, and non-transitory computer-readable medium described above, communicating with the wireless device comprises: participating in a RACH procedure with the wireless device in accordance with the identified tone spacing scheme, wherein a tone spacing for the RACH procedure may be different from a tone spacing for other stages of communication with the wireless device.

In some examples of the method, apparatus, and non-transitory computer-readable medium described above, communicating with the wireless device comprises: participating in data communications with the wireless device in accordance with the identified tone spacing scheme, wherein a tone spacing for the data communications may be different from a tone spacing for other stages of communication with the wireless device.

In some examples of the method, apparatus, and non-transitory computer-readable medium described above, communicating with the wireless device comprises: communicating with the wireless device using one or more different tone spacings for each type of different wireless communication channel types in accordance with the identified tone spacing scheme.

In some examples of the method, apparatus, and non-transitory computer-readable medium described above, communicating with the wireless device comprises: communicating via one or more control channels with the wireless device in accordance with the identified tone spacing scheme, wherein a tone spacing for the one or more control channels may be different from a tone spacing for other types of communication with the wireless device.

In some examples of the method, apparatus, and non-transitory computer-readable medium described above, communicating with the wireless device comprises: including an indication of the identified tone spacing scheme via a synchronization channel, a control channel a PBCH, an RRC message, or a SIB.

In some examples of the method, apparatus, and non-transitory computer-readable medium described above, communicating with the wireless device comprises: indicating the identified tone spacing scheme via a characteristic of a PSS, an SSS, or a reference signal.

In some examples of the method, apparatus, and non-transitory computer-readable medium described above, communicating with the wireless device comprises: indicating the identified tone spacing scheme for either an uplink communication, a downlink communication, or a sidelink communication.

DETAILED DESCRIPTION

Figure 1:
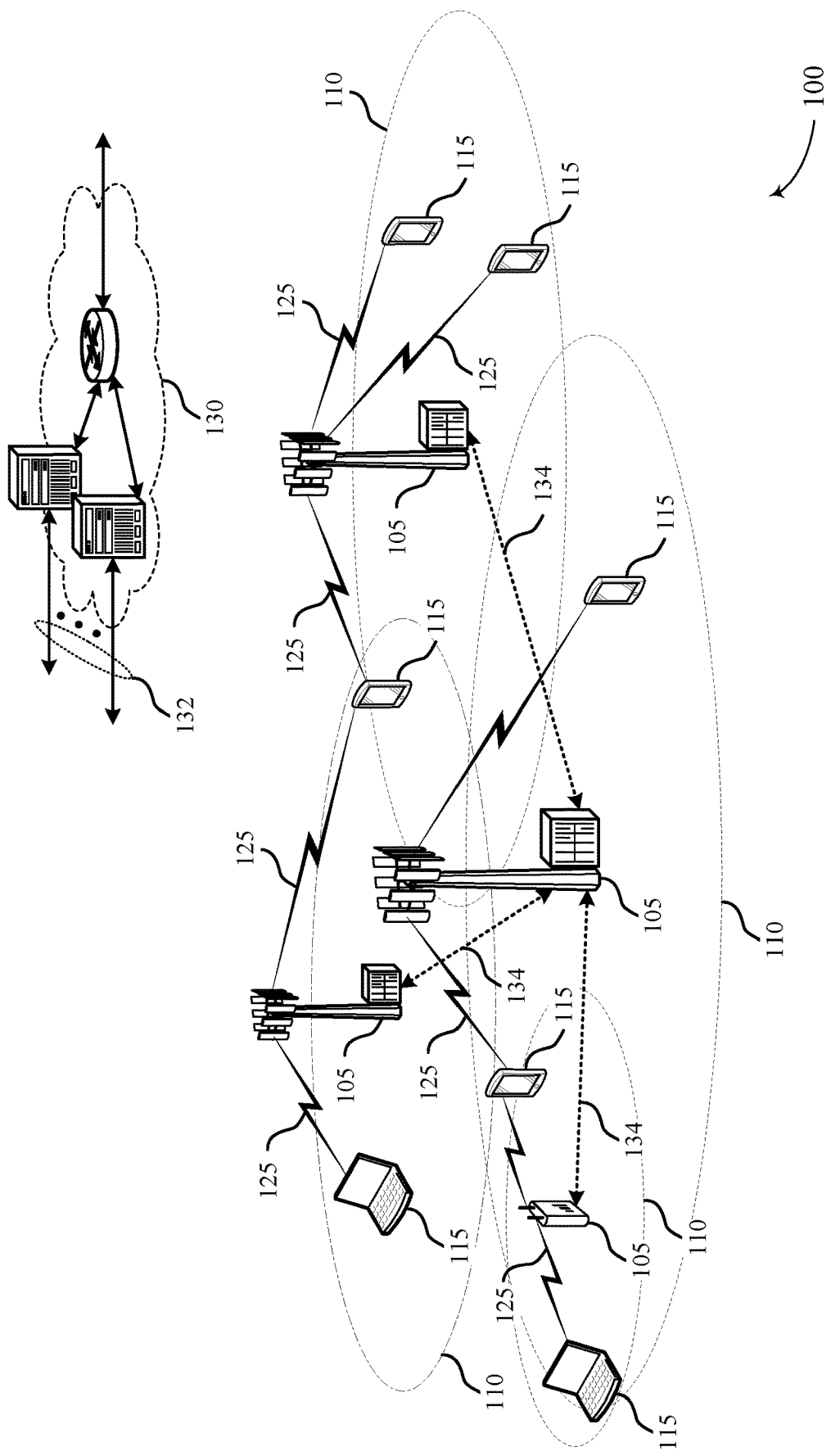
FIG. 1 illustrates an example of a system for wireless communication that supports different numerology for signal transmission in accordance with aspects of the present disclosure.

When communicating with a user equipment (UE), a base station may modulate data based on a modulation and coding scheme (MCS). The modulated data may then be mapped to sub-carriers in the frequency domain. As used herein, the mapping of the modulated data to subcarriers in the frequency domain is referred to as "tones." The modulated data may be mapped to resources in the time domain. As used herein, the mapping of the modulated data to resources in the time domain is referred to as "symbols." Each tone may be associated with a frequency and each symbol may have a corresponding symbol duration.

Time intervals in wireless communications may be expressed in multiples of a basic time unit and may be organized according to radio frames of a given length (e.g, 10 ms). Each frame may include multiple subframes that contain symbol periods and in some cases, a subframe may be the smallest unit of scheduling. Frequency resources within a frequency band may include multiple frequency subcarriers spaced apart according to a given tone spacing.

Some wireless communications systems (e.g., a Long Term Evolution (LTE)/LTE-Advanced (LTE-A) or a New Radio (NR) system) may employ a fixed tone spacing for communication between a base station and a UE. For instance, in an LTE/LTE-A system, the tone spacing may be the reciprocal of the symbol duration and may be selected in order to avoid or mitigate blurring caused by the Doppler shift and to maintain orthogonality between tones.

In contrast, adopting a different (or varied) tone spacing or symbol duration may help mitigate phase noise experienced when communicating in different (e.g., higher) frequency bands Accordingly, in some examples, a wireless communications system may adaptively support different tone spacing schemes for different channel types or at different stages of communication. The tone spacing schemes may be predetermined or selected from a number of tone spacing schemes available for communication.

In some examples, a UE and a base station may communicate using one or more tone spacings for each stage of different stages of communication. For example, a tone spacing scheme may include a tone spacing for communications on a first stage of communications and a different tone spacing for communications on a second stage of communications. A stage may refer to one or more procedures performed by the UE or base station or may refer to the state of the UE or base station. For example, the stage may refer to an initialization state and the UE may perform cell acquisition using synchronization signals transmitted by the base station. The stage may refer to a technique such as a handover from one cell to another cell where a UE establishes or reestablishes a communication link with one or more cells. The stage may also refer to whether a UE is in a connected or idle mode (e.g., RRC_CONNECTED or RRC_IDLE) with the network through one or more base stations. In one example, a UE may participate in a random access channel (RACH) procedure with a base station according to one tone spacing scheme and may also communicate with the base station according to a different tone spacing scheme during the exchange of data (e.g., using a shared or dedicated data channel).

In other examples, a tone spacing scheme may indicate a number of different tone spacings that may be applied to different types of communication channels. For instance, a UE may communicate with a base station using different tone spacing schemes that may differ based on a channel type, such as, for example, a RACH, a physical downlink control channel (PDCCH), a physical uplink control channel (PUCCH), among others. In particular, a tone spacing scheme may include a tone spacing for a first type of communication channel and a different tone spacing for a second type of communication channel.

In some examples, a characteristic of signal may indicate the tone spacing scheme. For instance, a characteristic such as the number of repetitions of a signal (e.g., a primary synchronization signal (PSS), a secondary synchronization signal (SSS), etc.) may indicate the tone spacing scheme. In some aspects, characteristics such as the number of tones or the pattern of tones over which a signal is transmitted may indicate the tone spacing scheme. For example, transmitting a signal over all tones, odd tones, even tones, or other pattern of tones may indicate the tone spacing scheme.

Accordingly, aspects of the disclosure are initially described in the context of a wireless communication system. Aspects of the disclosure are further illustrated by and described with reference to apparatus diagrams, system diagrams, and flowcharts that relate to different numerology for signal transmission.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-A) network or a 5G/NR network. The wireless communications system 100 may support different numerology for signal transmissions by employing different tone spacing schemes or numerologies for different stages of communication. In some examples, the wireless communications system 100 may employ different tone spacing schemes based on different wireless communication channel types.

The described techniques provide for varying numerology for different data channels (e.g., physical downlink shared channel (PDSCH) or physical uplink shared channel (PUSCH)), different control channels (e.g., physical downlink control channel (PDCCH) or physical uplink control channel (PUCCH), different reference signals (e.g., channel state information reference signal (CSI-RS)), synchronization signals (e.g., primary synchronization signal (PSS), secondary synchronization signal (SSS), or physical broadcast channel (PBCH)), or different frequency bands.

For example, higher frequency transmissions such as millimeter wave (mmW) transmissions may employ a different numerology (e.g., a tone spacing of 60, 120, or 240 kHz) than lower frequency transmissions such as sub-6 GHz transmission, which may utilize 15 or 30 kHZ tone spacing. In some cases, numerology may also differ for synchronization channels or random access channel (RACH) signals. For instance, sub-6 GHz communications may utilize 15 or 30 kHz tone spacing, where synchronization channels communicated at over 6 GHz may employ 120 or 240 kHz tone spacing. Other tone spacings may be considered without departing from the scope of the present disclosure.

In some instances, data communications, control communications, and synchronization communications may each utilize a different numerology having different tone spacings and may vary within different subframes. In some examples, a subframe may also be referred to as a slot, mini slot, transmission time interval (TTI), or any other duration. A subframe (or slot, mini slot, TTI, etc.) may be used as a unit of scheduling and in some cases may include 2 or more symbols. Additionally or alternatively, the subframe (or slot, mini slot, TTI, etc.) may contain a downlink (DL) control and an uplink (UL) control. In some examples, the subframe may include DL centric slots, that may include DL control as well as DL data. In some examples, the DL centric slot may include DL control at the beginning of the slot and DL data at the end of the slot. In some examples, the subframe (or slot, mini slot, TTI, etc.) may include UL centric slots, that may include UL control as well as UL data. In some examples, the UL centric slot may include UL data at the beginning of the slot and UL control at the end of the slot. In some other examples, the subframe (or slot, mini slot, TTI, etc.) may include DL centric slots and UL centric slots.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE.

As the center frequency of different spectrum bands increases, having a larger tone spacing may help mitigate phase noise experienced when communicating at higher frequencies. Accordingly, in some examples, wireless communications system 100 may support spectrum bands having different tone spacings. While tone spacing may be predetermined for a subframe (e.g., depending on the spectrum band or type of signal to be transmitted), tone spacing may additionally or alternatively vary throughout a subframe. In some examples, a subframe may span a duration in time and may be referred to as a slot, a mini slot, a time period, a TTI, or any other term used to describe a time interval. The subframe (or slot, mini slot, TTI, etc.) may be a unit of scheduling. In some examples, the subframe (also referred to as slot, mini slot, TTI, etc.) may be used to define timing boundaries. In some examples, the subframe (or slot, mini slot, TTI, etc.) may include 7, 14 or 28 symbols. In some examples, the subframe may include one or more slots, each of which may include multiple symbols that may be the smallest unit of scheduling. In other cases, the subframe or any other time duration may be the smallest unit of scheduling. In some cases, the subframe (or slot, mini slot, TTI, etc.) may include a DL control region and/or an UL control region.

Figure 2:
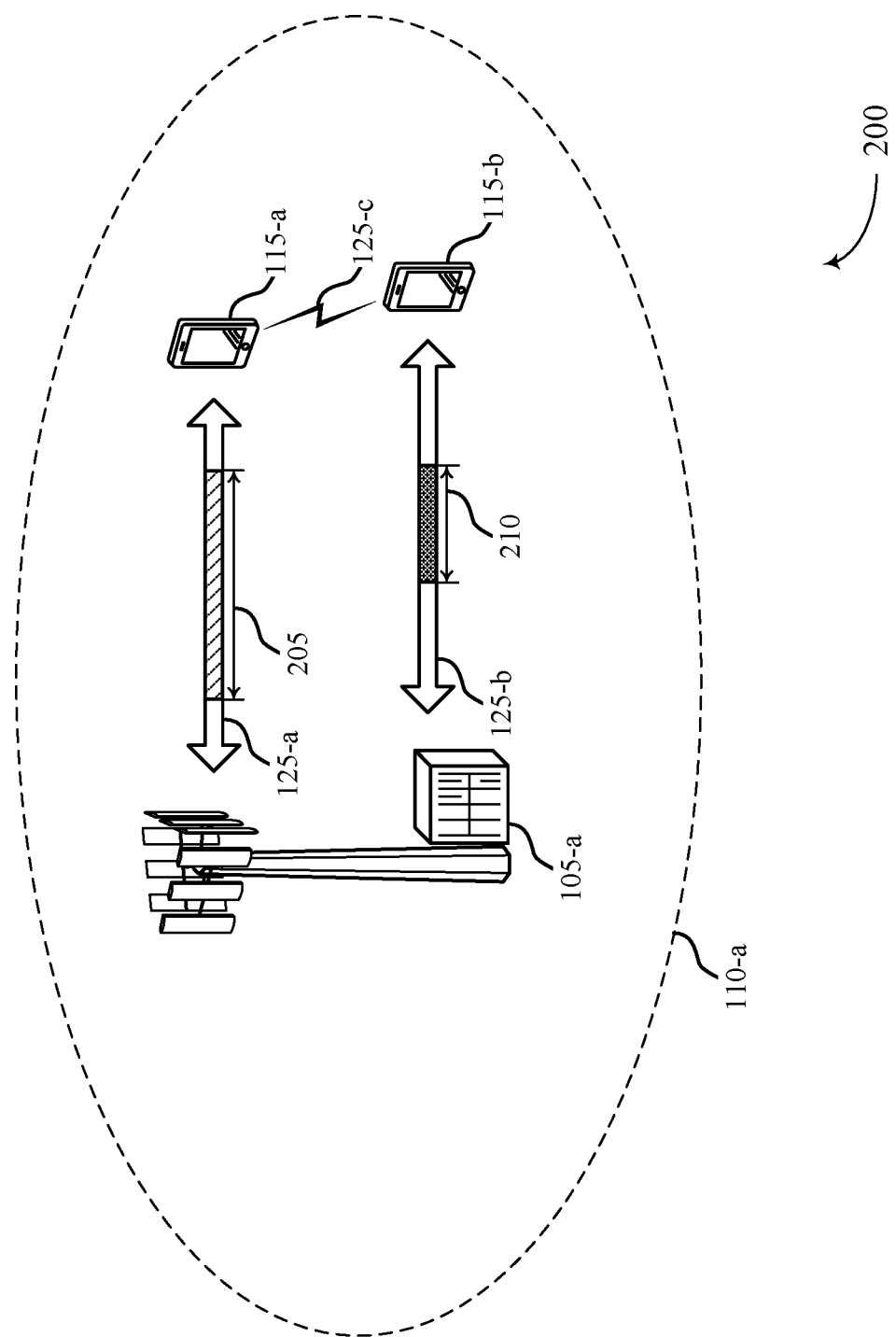
FIG. 2 illustrates an example of a system for wireless communication that supports different numerology for signal transmission in accordance with aspects of the present disclosure.

FIG. 2 illustrates an example of a wireless communications system 200 for different numerology for signal transmission. In some cases, wireless communications system 200 may represent aspects of techniques performed by a UE 115 or base station 105 as described with reference to FIG. 1. The wireless communications system 200 may include a base station 105-a that supports communication with multiple UEs 115-a and 115-b over a coverage area 110-a.

As shown, base station 105-a supports bi-directional communication with UE 115-a over communication link 125-a. Communication link 125-a may be used for communication according to a first tone spacing scheme associated with a given channel type. In downlink, for example, base station 105-a may transmit signals over a PDCCH to UE 115-a using resources 205 (e.g., time, frequency) corresponding to the first tone spacing scheme or numerology. The resources 205 may have a certain tone spacing and symbol duration based on the first tone spacing scheme and the tone spacing or symbol duration may differ depending on the channel type. For example, the base station 105-a may transmit signals via a PDCCH to UE 115-a over resources 205 based on the first tone spacing scheme and may transmit signals via a PBCH to UE 115-a over resources 205 according to a tone spacing scheme different from the first tone spacing scheme. In some examples, multiple symbols may span a slot, a mini slot, a subframe, or a frame and the number of symbols may vary depending on the tone spacing. For instance, a tone spacing of less than 60 kHz with a normal cyclic prefix (CP) may have 7 or 14 symbols per slot or mini slot, while a tone spacing of greater than 60 kHz with a normal CP may have 14 symbol per slot or mini slot.

Base station 105-a also supports communication with UE 115-b over communication link 125-b. Communication link 125-b may be used for communication according to a second tone spacing scheme associated with a given stage of wireless communication between the base station 105-a and the UE 115-b. In some cases, the first and second tone spacing schemes may be the same or alternatively, the first and second tone spacing schemes may be different. Stages of wireless communication may include different types of wireless communication procedures, such as a RACH procedure, a radio resource control (RRC) connection procedure, a synchronization procedure (e.g., a timing alignment procedure), procedures related to enhanced mobile broadband (eMBB) communications, or procedures related to ultra-reliable and low latency communications (URLLC). The stages of wireless communication may also depend on whether the UE 115-b is attempting to connect to base station 105-a, is connected to the base station 105-a, or has disconnected from the base station 105-a.

Based on the stage of wireless communication between the base station 105-a and the UE 115-b, base station 105-a may communicate with UE 115-b using resources 210 corresponding to the second tone spacing scheme. The resources 210 may have a certain tone spacing and symbol duration based on the second tone spacing scheme and the tone spacing or symbol duration may differ depending on the stage of wireless communication. For example, the UE 115-b may transmit a random access preamble in a RACH procedure to base station 105-a over resources 210 based on the second tone spacing scheme and may transmit uplink data to the base station 105-a over resources 210 according to a tone spacing scheme different from the second tone spacing scheme.

In some instances, a UEs 115-a and 115-b may communicate with base station 105-a using multiple tone spacings for the same channel type or during the same stage of communication. For example, UE 115-b may transmit a random access preamble when participating in a RACH procedure with base station 105-a using a third tone spacing scheme and the base station 105-a may transmit a random access response using a tone spacing different from the third tone spacing.

In another example, UEs 115-a and 115-b may communicate with base station 105-a using different tone spacing schemes for downlink, uplink, or sidelink (UE to UE) communications. For instance, UE 115-a may communicate with base station 105-a using a fourth tone spacing scheme for downlink and a fifth tone spacing scheme for uplink transmissions. In some cases, UE 115-a and 115-b may communicate with one another over communication link 125-c according to a sixth tone spacing scheme, which may be the same or different than any of the other tone spacing schemes.

In some examples, a UE 115-a may receive an indication from the base station 105-a that indicates the tone spacing scheme to be used for uplink, downlink, or sidelink communications. For example, a base station 105-a may transmit an indication to UE 115-a that indicates a tone spacing scheme to use for communication with UE 115-b in sidelink communications. UE 115-a may then communicate with UE 115-b based on the tone spacing scheme indicated by base station 105-a, which may differ depending on the communication channel type or a stage of communication between UE 115-a and UE 115-b.

In some aspects, a tone spacing scheme may indicate a number of different tone spacings that may be applied to different stages of communication or different types of communication channels. For example, UE 115-a may communicate with base station 105-a according to a tone spacing scheme that indicates different tone spacings to use for different stages (e.g., RACH procedure, data communications) or for different channels (e.g., PDCCH, PUCCH), while UE 115-b may communicate with base station 105-a according to a tone spacing scheme that indicates tone spacings different from those used for communication with UE 115-a. In addition to or instead of stages of communication or types of communication channels, persons skilled in the art will appreciate that tone spacing schemes between the various devices of FIG. 2 may differ and depend on any other suitable factor(s).

In some cases, the UE 115-a may also detect a tone spacing scheme (e.g., a numerology) being used by the base station 105-a based on a number of copies of one or more signals received from the base station 105-a. For instance, the base station may transmit multiple copies of one or more synchronization signals consecutively or over a given period of time. The number of repetitions may indicate a nominal subcarrier spacing (e.g., 17.5 kHz, 35 kHz, 140 kHz), which may be designated as the subcarrier spacing or of a given tone spacing scheme used for a particular stage, channel, or signal type, etc.

For example, one approach to indicate the nominal subcarrier spacing in a synchronization signal is to apply subcarrier shifting or subcarrier zeroing. In this case, downsampling the subcarriers in the frequency domain may result in repetitions of the synchronization signal in the time domain. Accordingly, a UE receiving the synchronization signal may detect the nominal numerology or subcarrier spacing by detecting a number of copies or repetitions of the synchronization signal over a given time (e.g., a number of symbols, subframes, TTIs, etc.).

For example, when 17.5 kHz, 35 kHz, and 140 kHz subcarrier spacing is supported, a UE 115-a may detect that the 17.5 kHz subcarrier spacing is being used when a single copy of the synchronization signal is detected. In another example, the UE 115-a may detect that the 35 kHz subcarrier spacing (which is a multiple of 2 of the 17.5 kHz subcarrier spacing) is being used when two copies of the synchronization signal are detected. In yet another example, the UE 115-a may detect that the 140 kHz subcarrier spacing (which is a multiple of 8 of the 17.5 kHz subcarrier spacing and a multiple of 4 of the 35 kHz subcarrier spacing) is being used when eight copies of the synchronization signal are detected.

Figure 3A:
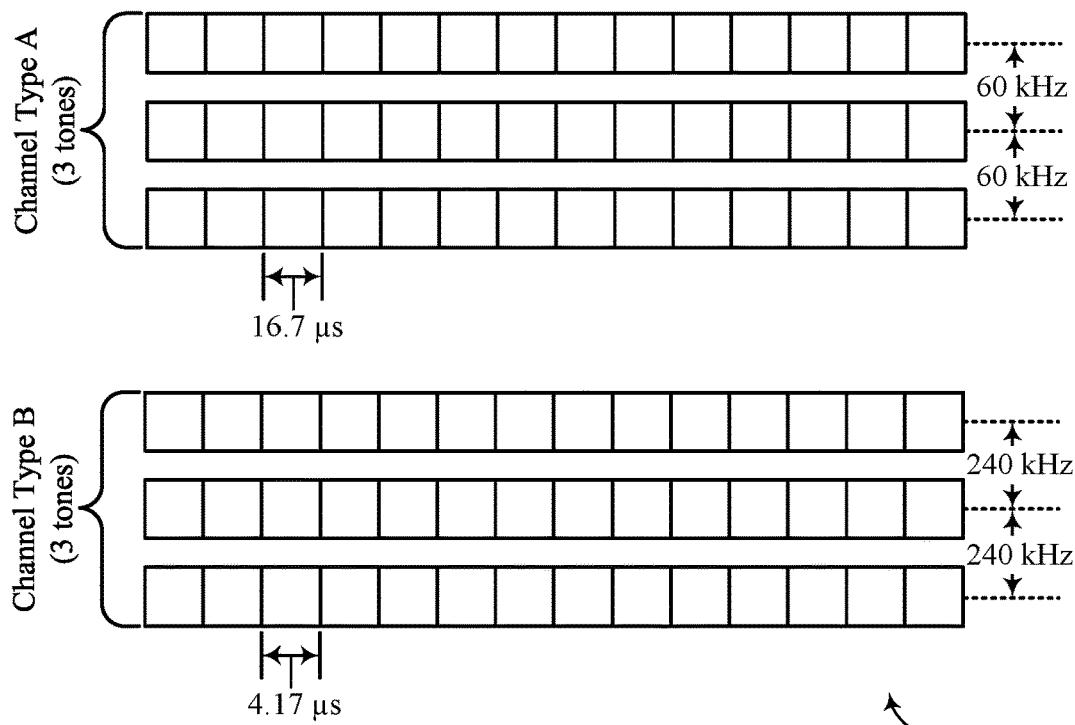
FIGS. 3A and 3B illustrate examples of tone spacing schemes that support different numerology for signal transmission in accordance with aspects of the present disclosure.
Figure 3B:
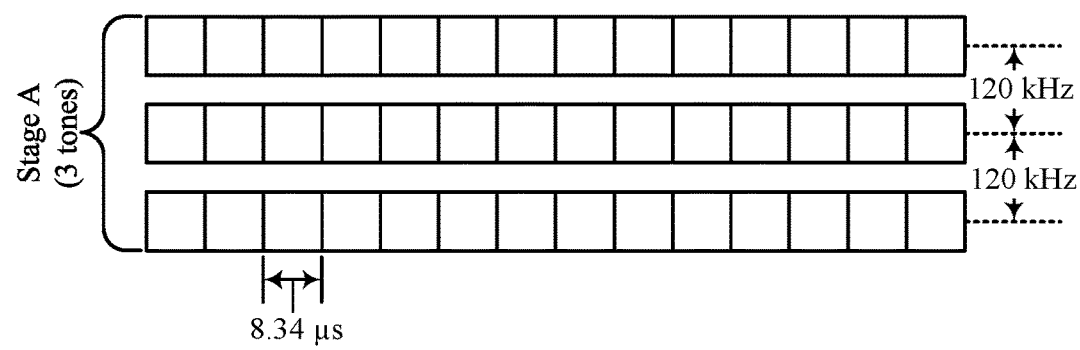
Figure 3B:
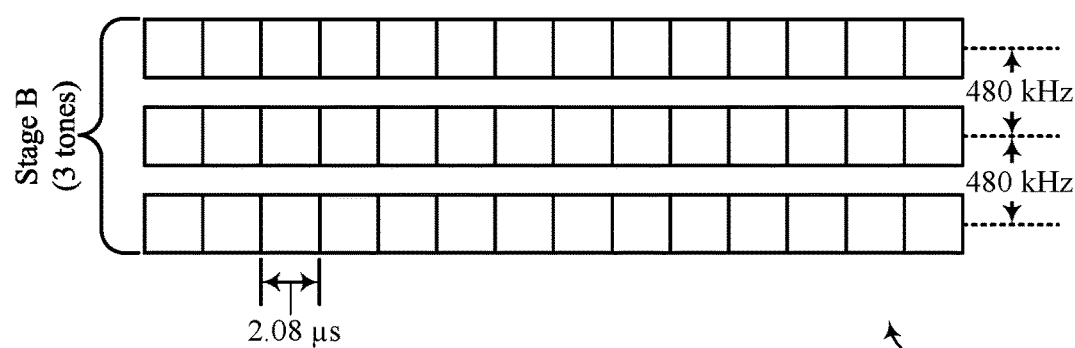

FIGS. 3A and 3B illustrate examples of tone spacing schemes 301 and 302 that support different numerology for signal transmission. In some cases, tone spacing schemes 301 and 302 may represent aspects of techniques performed by a UE 115 or base station 105 as described with reference to FIGS. 1 and 2. Tone spacing schemes 301 and 302 may be referred to as numerologies. As shown in FIGS. 3A and 3B, tone spacing as well as symbol duration may differ based on channel type or communication stage.

In FIG. 3A, Channel Type A may be associated with a numerology having a tone spacing of 60 kHz and a symbol duration of the reciprocal of the tone spacing (16.7 μs in this example). Channel Type A may be associated with a control signal (e.g., a PDCCH, PUCCH), a data signal, or an overhead signal (e.g., a CSI-RS).

Channel Type B may be associated with a numerology having a tone spacing of 240 kHz and a symbol duration related to the reciprocal of the tone spacing (4.17 μs in this example). Channel Type B may include a synchronization signal (e.g., a PSS, an SSS), an extended synchronization signal (ESS)), a PBCH, a RACH, a scheduling request channel, a beam reference signal (BRS), an extended PBCH, or a beam refinement reference signal (BRRS)).

In FIG. 3B, Stage A may be associated with a numerology having a tone spacing of 120 kHz and symbol duration of 8.34 μs. Stage A may be associated with a first stage of communication. For example, Stage A may be used for a RACH procedure or an RRC procedure. Stage B may be associated with a numerology having a tone spacing of 480 kHz and symbol duration of 2.08 μs. Stage B may be associated with a second state of communication, e.g., data communication.

As shown, tone spacing schemes 301 and 302 indicate a number of different tone spacings that may be applied to different stages of communication or different types of communication channels. For example, tone spacing scheme 301 may include a tone spacing for a first type of communication channel and a different tone spacing for a second type of communication channel. Further, tone spacing scheme 302 may include tone spacing for communication for a first stage of communications and a different tone spacing for communication for a second stage of communications. In some instances, the tone spacing scheme (e.g., tone spacing scheme 301 or tone spacing scheme 302) may indicate different tone spacings for uplink, downlink, or sidelink communications, or for combinations thereof. For example, the same tone spacing may be indicated for uplink and downlink communications, but a different tone spacing may be indicated for sidelink communications. In another example, a tone spacing may be indicated for uplink and a different tone spacing may be indicated for sidelink communications.

It should be understood that various other tone spacings and indications of tone spacing schemes may be considered without departing from the scope of the present disclosure. Further, it should be understood that the tone spacings and symbol durations described above with reference to FIGS. 3A and 3B are for purposes of example only and other tone spacings or symbol durations may be considered without departing from the scope of the present disclosure.

Figure 4:
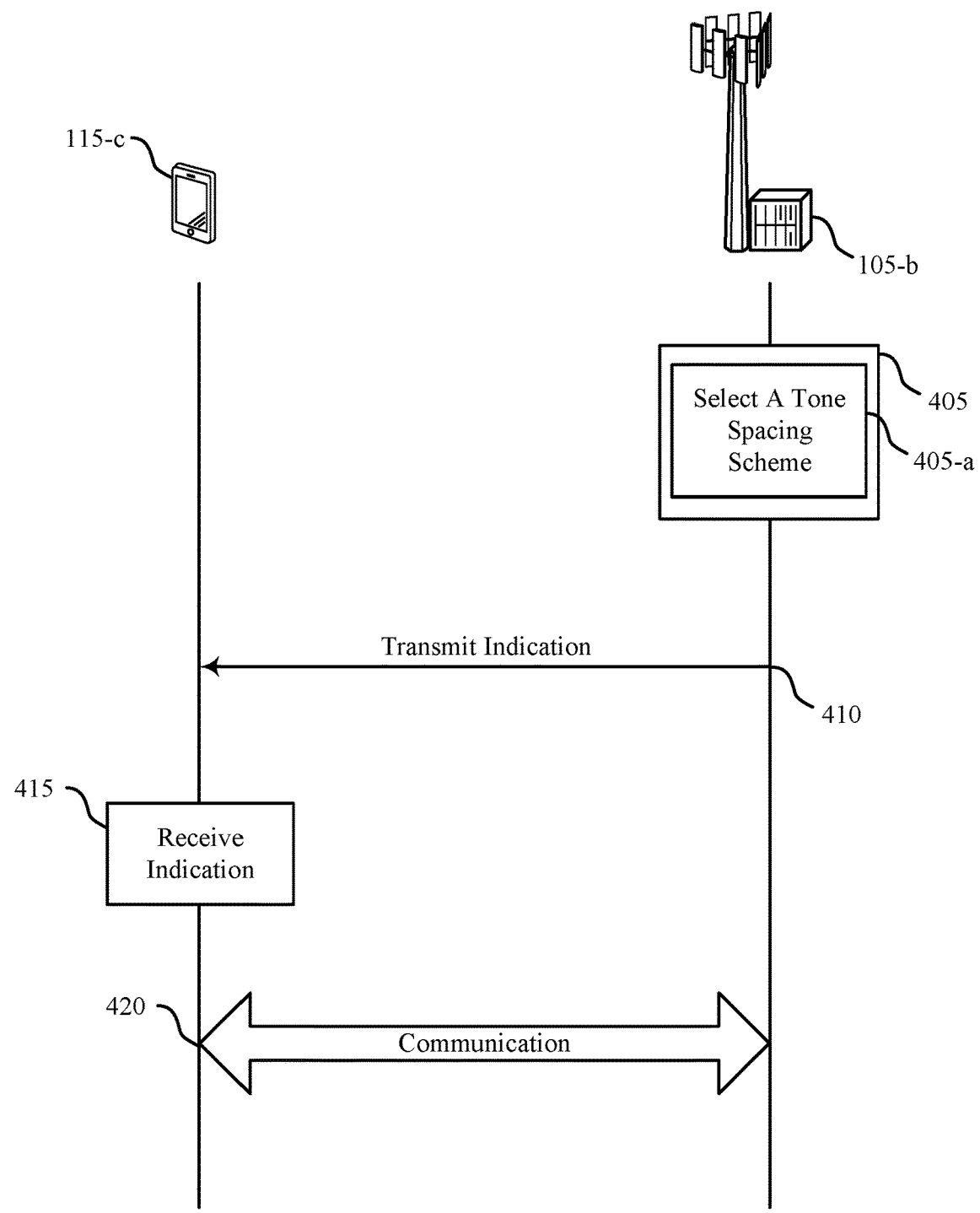
FIG. 4 illustrates an example of a process flow for different numerology for signal transmission in accordance with aspects of the present disclosure.

FIG. 4 illustrates an example of a process flow 400 for different numerology for signal transmission. In some cases, process flow 400 may represent aspects of techniques performed by a UE 115 or base station 105 as described with reference to FIGS. 1, 2, 3A, and 3B.

At 405, base station 105-b identifies a tone spacing scheme for transmission of a signal. To identify the tone spacing scheme, the base station 105-b may determine the channel over which to communicate with UE 115-c or the base station 105-b may determine the stage of communication associated with the UE 115-c. In some examples, the base station 105-b may identify a tone spacing scheme by selecting a tone spacing scheme from a plurality of tone spacing schemes available for communication at 405-a.

At 410, the base station 105-b may transmit an indication of the tone spacing scheme to the UE 115-c. The indication may indicate the tone spacing identified in 405 that may include the tone spacing or symbol duration for communication between UE 115-c and base station 105-b. In some examples, the base station 105-b may include the indication in a synchronization signal (e.g., a PSS, an SSS), a broadcast channel (e.g., a PBCH), an RRC message, or a reference signal (e.g., CSI-RS). The base station 105-b may include the indication in a system information block (SIB) (e.g., in a broadcast control channel (BCCH)). In some examples, the base station 105-b may include the indication in a control channel (e.g., a PDCCH), which may indicate the tone spacing scheme to be used in a current or future subframe. The indication may also be used to indicate whether the tone spacing scheme is to be used for uplink, downlink, or sidelink (e.g., UE to UE) communication.

At 415, the UE 115-c may receive the indication of the tone spacing scheme transmitted by base station 105-b at 410 and communicate with base station 105-b according to the received tone spacing scheme at 420. Communicating with the base station 105-b may include communicating using one or more different tone spacings for each stage of different stages of wireless communications based on the received tone spacing scheme. In some examples, the base station 105 may participate in a RACH procedure with the UE 115-c based on the identified tone spacing scheme. In other examples, the UE 115-c and the base station 105-b may transmit and receive data packets based on the identified tone spacing scheme. In yet other examples, the UE 115-c and the base station 105b may communicate using one or more different tone spacings for each channel type based on the identified tone spacing scheme. In some examples, the base station 105-b may transmit signals over one or more control channels to the UE 115-*c* in accordance with the identified tone spacing scheme.

While FIG. 4 illustrates a number of processes, it should be understood that not all of the steps in process flow 400 need to be performed or various steps may be performed simultaneously or in a different order than shown and described above.

Figure 5:
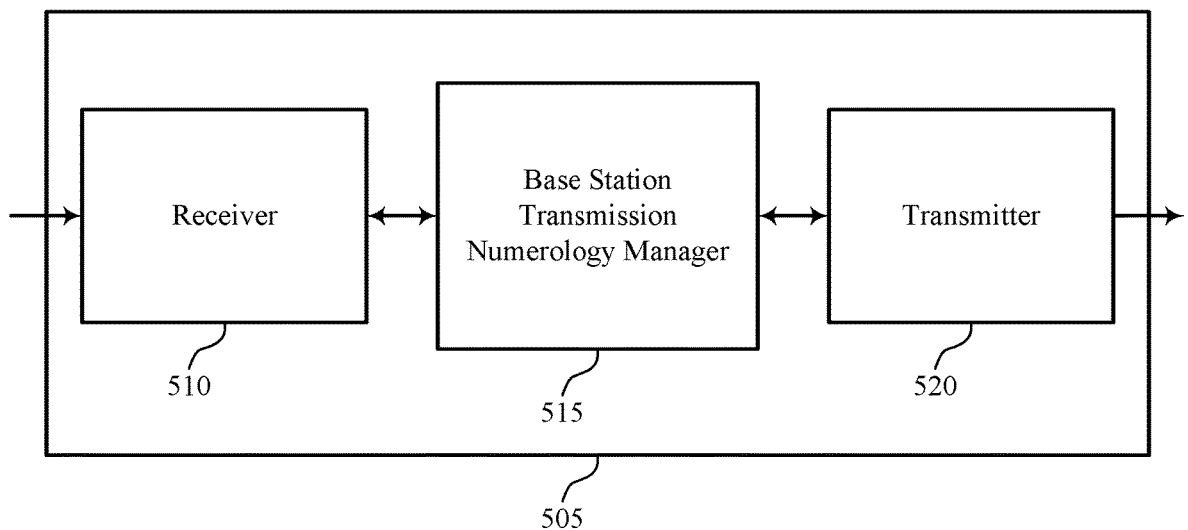
FIGS. 5 through 7 show block diagrams of a device that supports different numerology for signal transmission in accordance with aspects of the present disclosure.

FIG. 5 shows a block diagram 500 of a wireless device 505 that supports different numerology for signal transmission in accordance with various aspects of the present disclosure. Wireless device 505 may be an example of aspects of a base station 105 as described with reference to FIG. 1. Wireless device 505 may include receiver 510, base station transmission numerology manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to different numerology for signal transmission, etc.). Information may be passed on to other components of the device. The receiver 510 may be an example of aspects of the transceiver 835 described with reference to FIG. 8.

Base station transmission numerology manager 515 may be an example of aspects of the base station transmission numerology manager 815 described with reference to FIG. 8.

Base station transmission numerology manager 515 may identify a tone spacing scheme that includes different tone spacings for wireless communications within a wireless network and transmit an indication of the identified tone spacing scheme to a UE.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or may include a set of antennas.

Figure 6:
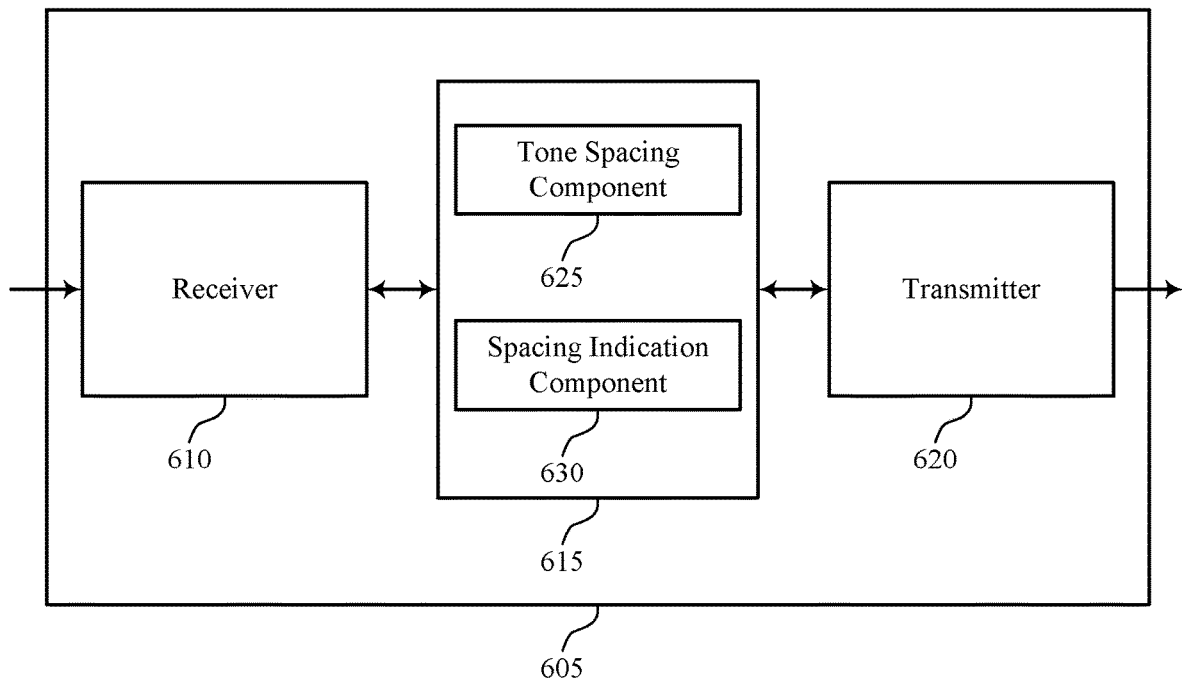

FIG. 6 shows a block diagram 600 of a wireless device 605 that supports different numerology for signal transmission in accordance with various aspects of the present disclosure. Wireless device 605 may be an example of aspects of a wireless device 505 or a base station 105 as described with reference to FIGS. 1, 2, 4, and 5. Wireless device 605 may include receiver 610, base station transmission numerology manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to different numerology for signal transmission, etc.). Information may be passed on to other components of the device. The receiver 610 may be an example of aspects of the transceiver 835 described with reference to FIG. 8.

Base station transmission numerology manager 615 may be an example of aspects of the base station transmission numerology manager 815 described with reference to FIG. 8. Base station transmission numerology manager 615 may also include tone spacing component 625 and spacing indication component 630.

Tone spacing component 625 may identify a tone spacing scheme that includes different tone spacings for wireless communications within a wireless network and select the tone spacing scheme from a set of available tone spacing schemes.

Spacing indication component 630 may transmit an indication of the identified tone spacing scheme to a UE. In some cases, transmitting the indication of the identified tone spacing scheme includes: including the indication of the identified tone spacing scheme in a synchronization channel. In some cases, transmitting the indication of the identified tone spacing scheme includes: including the indication of the identified tone spacing scheme in a PBCH or a SIB. In some cases, transmitting the indication of the identified tone spacing scheme includes: indicating the identified tone spacing scheme via a characteristic of a PSS, an SSS, or a reference signal. In some cases, transmitting the indication of the identified tone spacing scheme includes: including the indication of the identified tone spacing scheme in a RRC message.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or may include a set of antennas.

Figure 7:
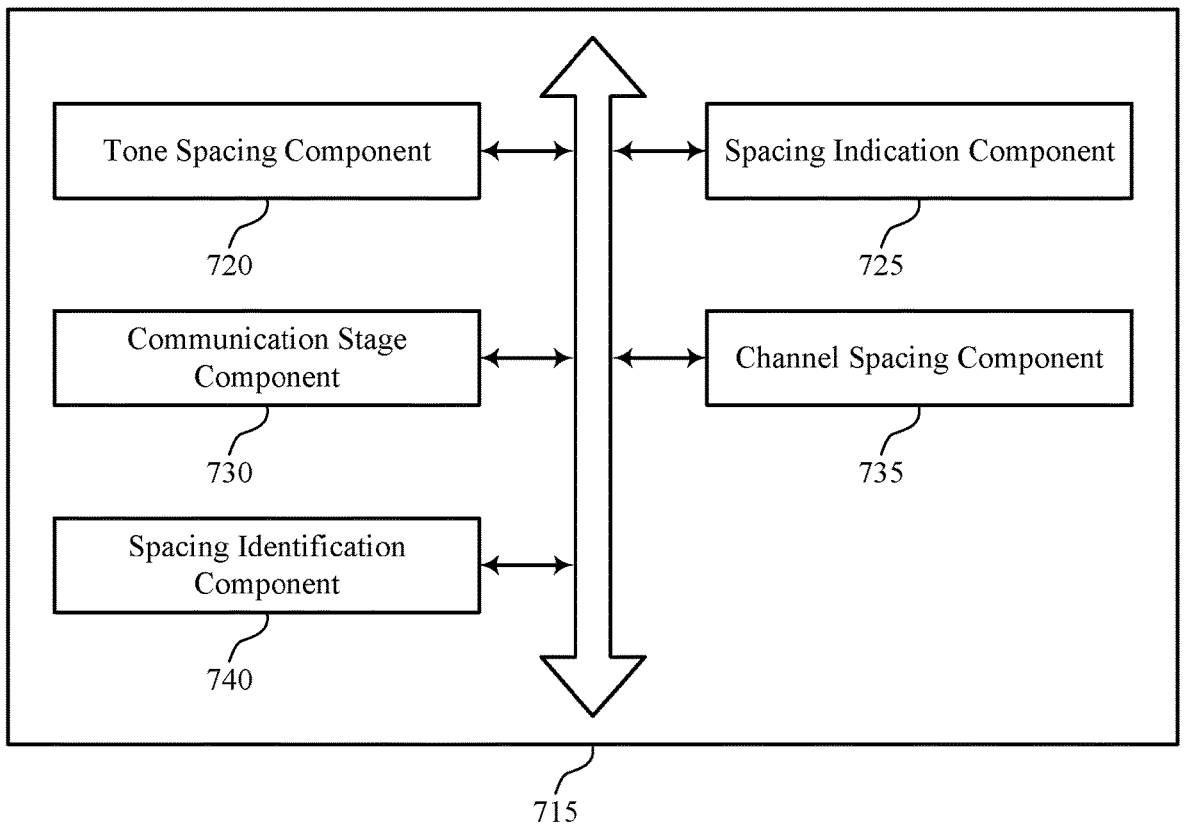

FIG. 7 shows a block diagram 700 of a base station transmission numerology manager 715 that supports different numerology for signal transmission in accordance with various aspects of the present disclosure. The base station transmission numerology manager 715 may be an example of aspects of a base station transmission numerology manager 515 or a base station transmission numerology manager 615 described with reference to FIGS. 5 and 6. The base station transmission numerology manager 715 may include tone spacing component 720, spacing indication component 725, communication stage component 730, channel spacing component 735, and spacing identification component 740. Each of these modules may communicate, directly or indirectly, with one another (e.g., via one or more buses).

Tone spacing component 720 may identify a tone spacing scheme that includes different tone spacings for wireless communications within a wireless network and select the tone spacing scheme from a set of available tone spacing schemes.

Spacing indication component 725 may transmit an indication of the identified tone spacing scheme to a UE. In some cases, transmitting the indication of the identified tone spacing scheme includes: including the indication of the identified tone spacing scheme in a synchronization channel. In some cases, transmitting the indication of the identified tone spacing scheme includes: including the indication of the identified tone spacing scheme in a PBCH, an MIB, or a SIB. In some cases, the SIB may include minimum system information or other system information. In some cases, transmitting the indication of the identified tone spacing scheme includes: indicating the identified tone spacing scheme via a characteristic of a PSS, an SSS, or a reference signal. In some examples, the characteristic may include a number of repetitions, a number of tones, a pattern of tones, or combinations thereof. In some cases, transmitting the indication of the identified tone spacing scheme includes: including the indication of the identified tone spacing scheme in a RRC message. In some cases, at least one synchronization signal may include a PSS, an SSS, a PBCH, or combinations thereof. In some cases, the tone spacing of at least one synchronization signal may be different from at least one other synchronization signal. In some cases, the tone spacing of at least one synchronization signal may be different from other channels of communication.

Communication stage component 730 may communicate with the UE using one or more different tone spacings for each stage of different stages of wireless communications in accordance with the identified tone spacing scheme. In some cases, communicating with the UE includes: participating in a RACH procedure with the UE in accordance with the identified tone spacing scheme, where a tone spacing for the RACH procedure is different from a tone spacing for other stages of communication with the UE. In some cases, communicating with the UE includes: participating in data communications with the UE in accordance with the identified tone spacing scheme, where a tone spacing for the data communications is different from a tone spacing for other stages of communication with the UE.

Channel spacing component 735 may communicating with the UE using one or more different tone spacings for each type of different wireless communication channel types in accordance with the identified tone spacing scheme. In some cases, communicating with the UE includes: transmitting one or more control channels to the UE in accordance with the identified tone spacing scheme, where a tone spacing for the one or more control channels is different from a tone spacing for other types of communication with the UE.

Spacing identification component 740 may indicate the identified tone spacing scheme for either a current subframe or a future subframe and indicate the identified tone spacing scheme for either an uplink, a downlink, or a sidelink communication. In some cases, transmitting the indication of the identified tone spacing scheme includes: including the indication of the identified tone spacing scheme in a control channel.

Figure 8:
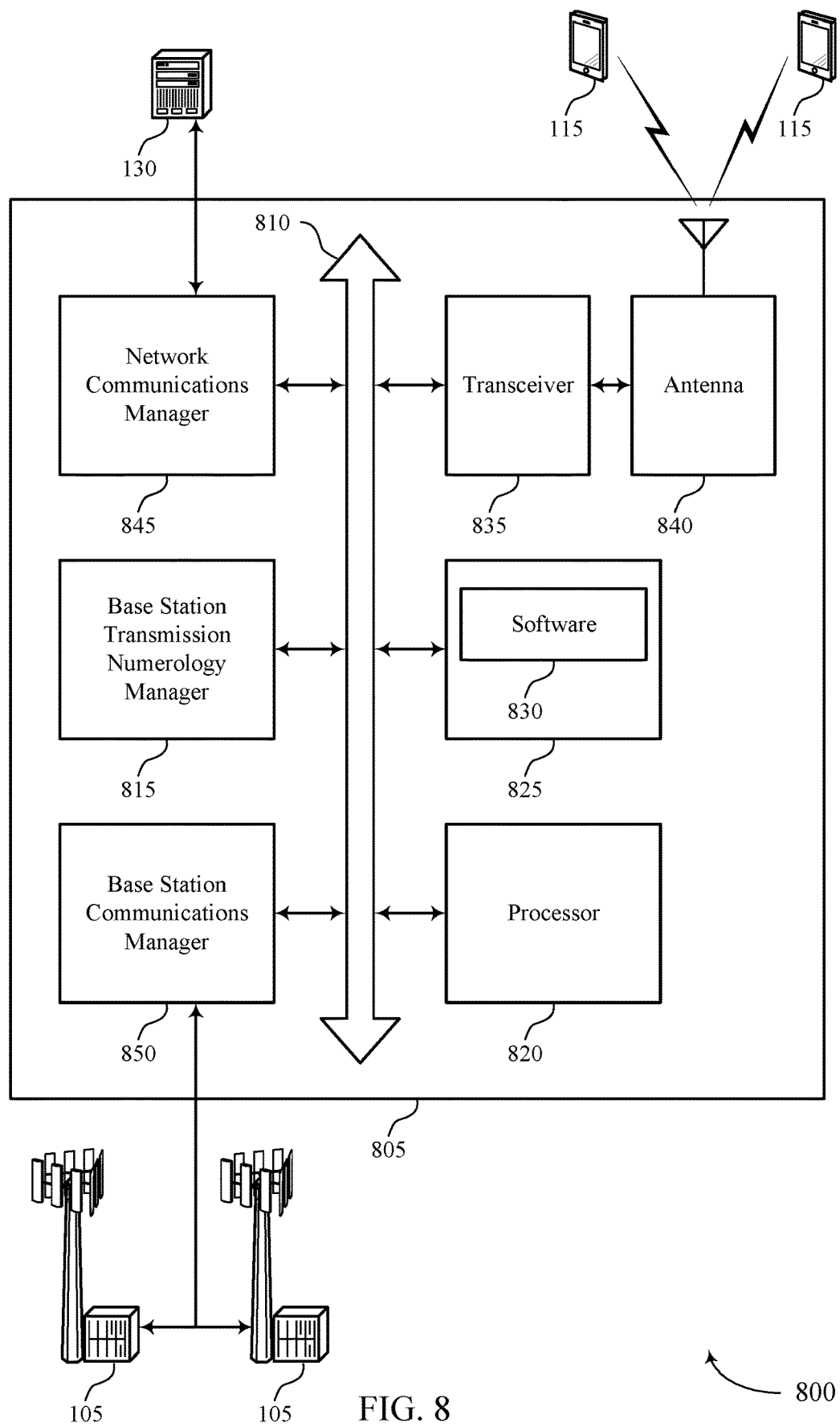
FIG. 8 illustrates a block diagram of a system including a base station that supports different numerology for signal transmission in accordance with aspects of the present disclosure.

FIG. 8 shows a diagram of a system 800 including a device 805 that supports different numerology for signal transmission in accordance with various aspects of the present disclosure. Device 805 may be an example of or include the components of wireless device 505, wireless device 605, or a base station 105 as described above, e.g., with reference to FIGS. 1, 2, 4, 5, and 6.

Device 805 may include components for bi-directional voice and data communications including components for transmitting and receiving communications, including base station transmission numerology manager 815, processor 820, memory 825, software 830, transceiver 835, antenna 840, network communications manager 845, and base station communications manager 850.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., function or tasks supporting different numerology for signal transmission).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a Basic Input-Output system (BIOS) which may control basic hardware and/or software operation such as the interaction with peripheral components or devices.

Software 830 may include code to implement aspects of the present disclosure, including code to support different numerology for signal transmission. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications module 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
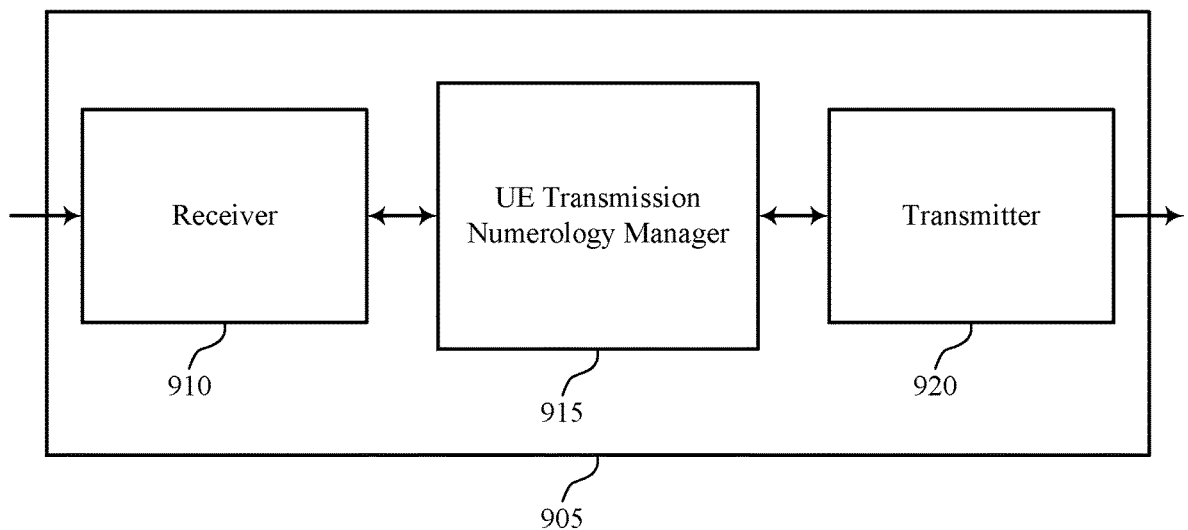
FIGS. 9 through 11 show block diagrams of a device that supports different numerology for signal transmission in accordance with aspects of the present disclosure.

FIG. 9 shows a block diagram 900 of a wireless device 905 that supports different numerology for signal transmission in accordance with various aspects of the present disclosure. Wireless device 905 may be an example of aspects of a UE 115 as described with reference to FIGS. 1, 2, and 4. Wireless device 1105 may include receiver 910, UE transmission numerology manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to different numerology for signal transmission, etc.). Information may be passed on to other components of the device. The receiver 910 may be an example of aspects of the transceiver 1235 described with reference to FIG. 12.

UE transmission numerology manager 915 may receive, from a base station, an indication of a tone spacing scheme that includes different tone spacings for wireless communications within a wireless network, communicating with the base station in accordance with the tone spacing scheme, and communicating with a UE in accordance with the tone spacing scheme. UE transmission numerology manager 915 may be an example of aspects of the UE transmission numerology manager 1215 described with reference to FIG. 12.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or may include a set of antennas.

Figure 10:
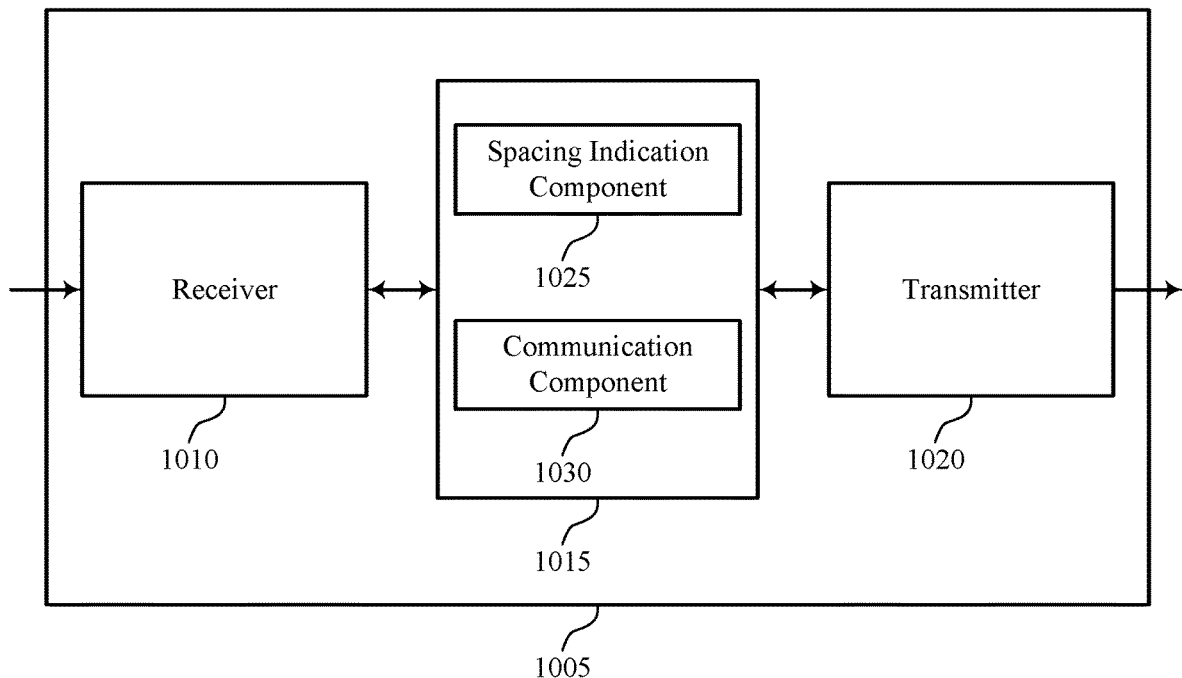

FIG. 10 shows a block diagram 1000 of a wireless device 1005 that supports different numerology for signal transmission in accordance with various aspects of the present disclosure. Wireless device 1005 may be an example of aspects of a wireless device 905 or a UE 115 as described with reference to FIGS. 1, 2, 4, 9, and 11. Wireless device 1005 may include receiver 1010, UE transmission numerology manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to different numerology for signal transmission, etc.). Information may be passed on to other components of the device. The receiver 1010 may be an example of aspects of the transceiver 1235 described with reference to FIG. 12.

UE transmission numerology manager 1015 may be an example of aspects of the UE transmission numerology manager 1215 described with reference to FIG. 12.

UE transmission numerology manager 1015 may also include spacing indication component 1025 and communication component 1030.

Spacing indication component 1025 may receive, from a base station, an indication of a tone spacing scheme that includes different tone spacings for wireless communications within a wireless network. In some cases, receiving the indication of the tone spacing scheme includes: receiving the indication of the tone spacing scheme in a synchronization channel. In some cases, receiving the indication of the tone spacing scheme includes: receiving the indication of the tone spacing scheme in a PBCH or a SIB. In some cases, receiving the indication of the tone spacing scheme includes: receiving the indication of the tone spacing scheme via a characteristic of PSS, an SSS, or a reference signal. In some cases, receiving the indication of the tone spacing scheme includes: receiving the indication of the tone spacing scheme in a RRC message.

Communication component 1030 may communicating with the base station in accordance with the tone spacing scheme and communicating with a UE in accordance with the tone spacing scheme. In some cases, communicating with the base station includes: participating in a RACH procedure with the base station in accordance with the tone spacing scheme, where a tone spacing for the RACH procedure is different from a tone spacing for other stages of communication with the base station. In some cases, communicating with the base station includes: participating in data communications with the base station in accordance with the tone spacing scheme, where a tone spacing for the data communications is different from a tone spacing for other stages of communication with the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1035 described with reference to FIG. 10. The transmitter 1020 may include a single antenna, or may include a set of antennas.

Figure 11:
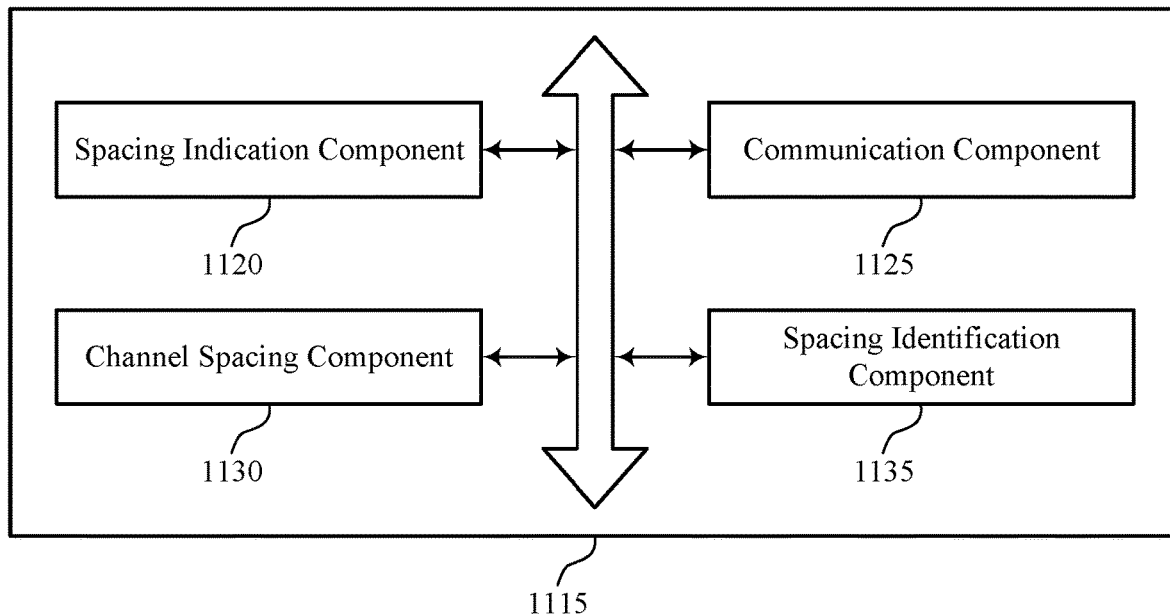

FIG. 11 shows a block diagram 1100 of a UE transmission numerology manager 1115 that supports different numerology for signal transmission in accordance with various aspects of the present disclosure. The UE transmission numerology manager 1115 may be an example of aspects of a UE transmission numerology manager 915, UE transmission numerology manager 1015, or UE transmission numerology manager 1215 as described with reference to FIGS. 9, 10, and 12. The UE transmission numerology manager 1115 may include spacing indication component 1120, communication component 1125, channel spacing component 1130, and spacing identification component 1135. Each of these modules may communicate, directly or indirectly, with one another (e.g., via one or more buses).

Spacing indication component 1120 may receive, from a base station, an indication of a tone spacing scheme that includes different tone spacings for wireless communications within a wireless network. In some cases, receiving the indication of the tone spacing scheme includes: receiving the indication of the tone spacing scheme in a synchronization channel. In some cases, receiving the indication of the tone spacing scheme includes: receiving the indication of the tone spacing scheme in a PBCH or a SIB. In some cases, receiving the indication of the tone spacing scheme includes: receiving the indication of the tone spacing scheme via a characteristic of a PSS, an SSS, or a reference signal. In some cases, receiving the indication of the tone spacing scheme includes: receiving the indication of the tone spacing scheme in a RRC message.

Communication component 1125 may communicating with the base station in accordance with the tone spacing scheme and communicating with a UE in accordance with the tone spacing scheme. In some cases, communicating with the base station includes: participating in a RACH procedure with the base station in accordance with the tone spacing scheme, where a tone spacing for the RACH procedure is different from a tone spacing for other stages of communication with the base station. In some cases, communicating with the base station includes: participating in data communications with the base station in accordance with the tone spacing scheme, where a tone spacing for the data communications is different from a tone spacing for other stages of communication with the base station.

Channel spacing component 1130 may communicating with the base station using one or more different tone spacings for each type of different wireless communication channel types in accordance with the identified tone spacing scheme, communicating with the UE using different tone spacings for different stages of wireless communications in accordance with the identified tone spacing scheme, communicating with the UE using one or more different tone spacings for each stage of different stages of wireless communications in accordance with the identified tone spacing scheme, communicating with the UE using different tone spacings for different wireless communication channel types in accordance with the identified tone spacing scheme, and communicating with the UE using one or more different tone spacings for each type of different wireless communication channel types in accordance with the identified tone spacing scheme. In some cases, communicating with the base station includes: receiving one or more control channels from the base station in accordance with the tone spacing scheme, where a tone spacing for the one or more control channels is different from a tone spacing for other types of communication with the base station.

Spacing identification component 1135 may identify a tone spacing scheme for a variety of instances or durations. In some cases, receiving the indication of the tone spacing scheme includes: receiving the indication of the tone spacing scheme in a control channel. In some cases, receiving the indication of the tone spacing scheme includes: receiving the indication of the tone spacing scheme for either a current subframe or a future subframe. In some cases, receiving the indication of the tone spacing scheme includes: receiving the indication of the tone spacing scheme for either an uplink, a downlink, or a sidelink communication.

Figure 12:
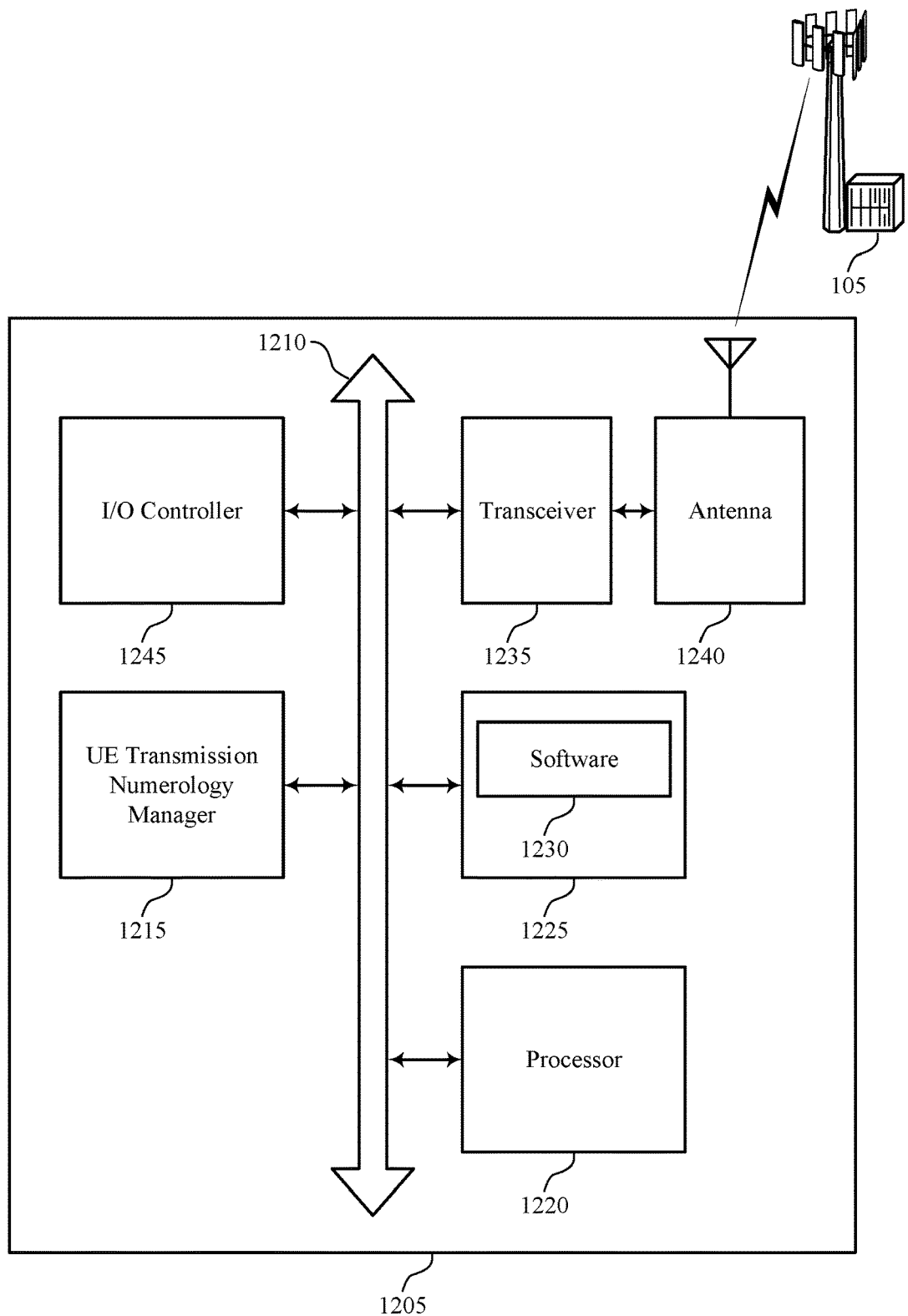
FIG. 12 illustrates a block diagram of a system including a user equipment (UE) that supports different numerology for signal transmission in accordance with aspects of the present disclosure.

FIG. 12 shows a diagram of a system 1200 including a device 1205 that supports different numerology for signal transmission in accordance with various aspects of the present disclosure. Device 1205 may be an example of or include the components of a UE 115, wireless device 905, wireless device 1005, or wireless device 1105 as described above, e.g., with reference to FIGS. 1, 2, 4, and 9-11.

Device 1205 may include components for bi-directional voice and data communications including components for transmitting and receiving communications, including UE transmission numerology manager 1215, processor 1220, memory 1225, software 1230, transceiver 1235, antenna 1240, and I/O controller 1245.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., function or tasks supporting different numerology for signal transmission).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support different numerology for signal transmission. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. Input/output control component 1245 may also manage peripherals not integrated into device 1205. In some cases, input/output control component 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
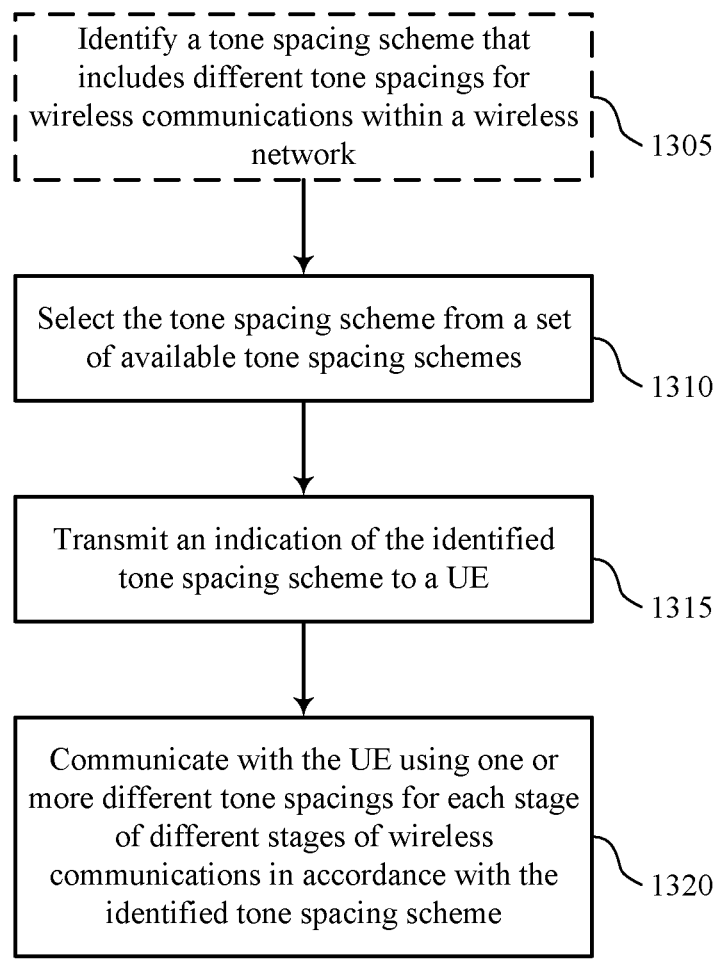
FIGS. 13 through 17 illustrate methods for different numerology for signal transmission in accordance with aspects of the present disclosure.

FIG. 13 shows a flowchart illustrating a method 1300 for different numerology for signal transmission in accordance with various aspects of the present disclosure. The operations of method 1300 may be implemented by a base station 105 or its components as described herein. For example, the operations of method 1300 may be performed by a base station transmission numerology manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305, the base station 105 may optionally identify a set of available tone spacing schemes, where each available tone spacing scheme may include different tone spacings for wireless communications within a wireless network. The operations of block 1305 may be performed according to the methods described with reference to FIGS. 1 through 4. In certain examples, aspects of the operations of block 1305 may be performed by a tone spacing component as described with reference to FIGS. 5 through 8.

At block 1310, the base station 105 may select the tone spacing scheme from the set of available tone spacing schemes. The operations of block 1310 may be performed according to the methods described with reference to FIGS. 1 through 4. In certain examples, aspects of the operations of block 1310 may be performed by a tone spacing component as described with reference to FIGS. 5 through 8.

At block 1315, the base station 105 may transmit an indication of the selected tone spacing scheme to a UE. The operations of block 1315 may be performed according to the methods described with reference to FIGS. 1 through 4. In certain examples, aspects of the operations of block 1315 may be performed by a spacing indication component as described with reference to FIGS. 5 through 8.

At block 1320, the base station 105 may communicate with the UE using one or more different tone spacings for each stage of different stages of wireless communications in accordance with the identified tone spacing scheme. The operations of block 1320 may be performed according to the methods described with reference to FIGS. 1 through 4. In certain examples, aspects of the operations of block 1320 may be performed by a communication stage component as described with reference to FIGS. 5 through 8.

Figure 14:
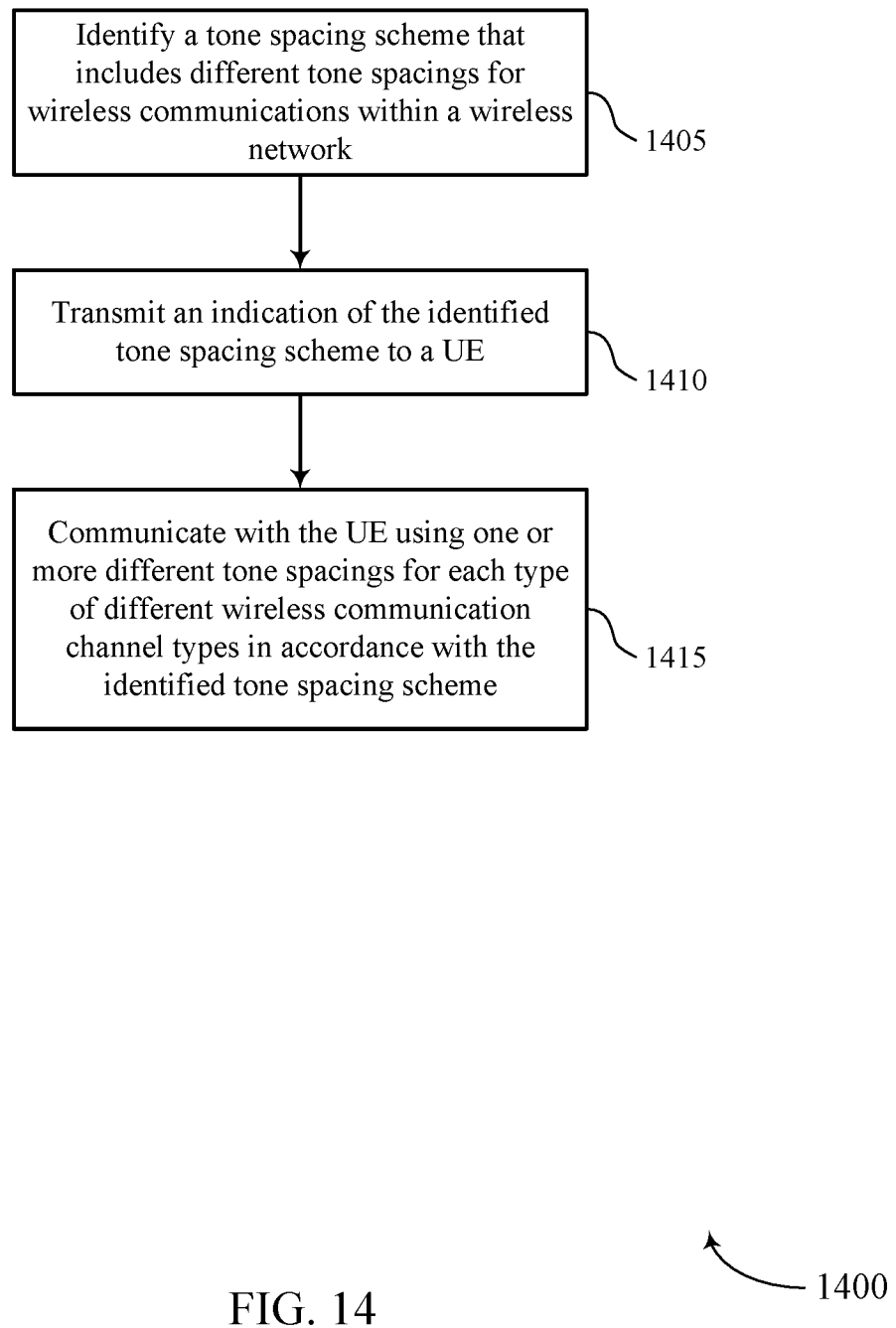

FIG. 14 shows a flowchart illustrating a method 1400 for different numerology for signal transmission in accordance with various aspects of the present disclosure. The operations of method 1400 may be implemented by a base station 105 or its components as described herein. For example, the operations of method 1400 may be performed by a base station transmission numerology manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405, the base station 105 may identify a tone spacing scheme that includes different tone spacings for wireless communications within a wireless network. The operations of block 1405 may be performed according to the methods described with reference to FIGS. 1 through 4. In certain examples, aspects of the operations of block 1405 may be performed by a tone spacing component as described with reference to FIGS. 5 through 8.

At block 1410, the base station 105 may transmit an indication of the identified tone spacing scheme to a UE. The operations of block 1410 may be performed according to the methods described with reference to FIGS. 1 through 4. In certain examples, aspects of the operations of block 1410 may be performed by a spacing indication component as described with reference to FIGS. 5 through 8.

At block 1415, the base station 105 may communicate with the UE using one or more different tone spacings for each type of different wireless communication channel types in accordance with the identified tone spacing scheme. The operations of block 1415 may be performed according to the methods described with reference to FIGS. 1 through 4. In certain examples, aspects of the operations of block 1415 may be performed by a channel spacing component as described with reference to FIGS. 5 through 8.

Figure 15:
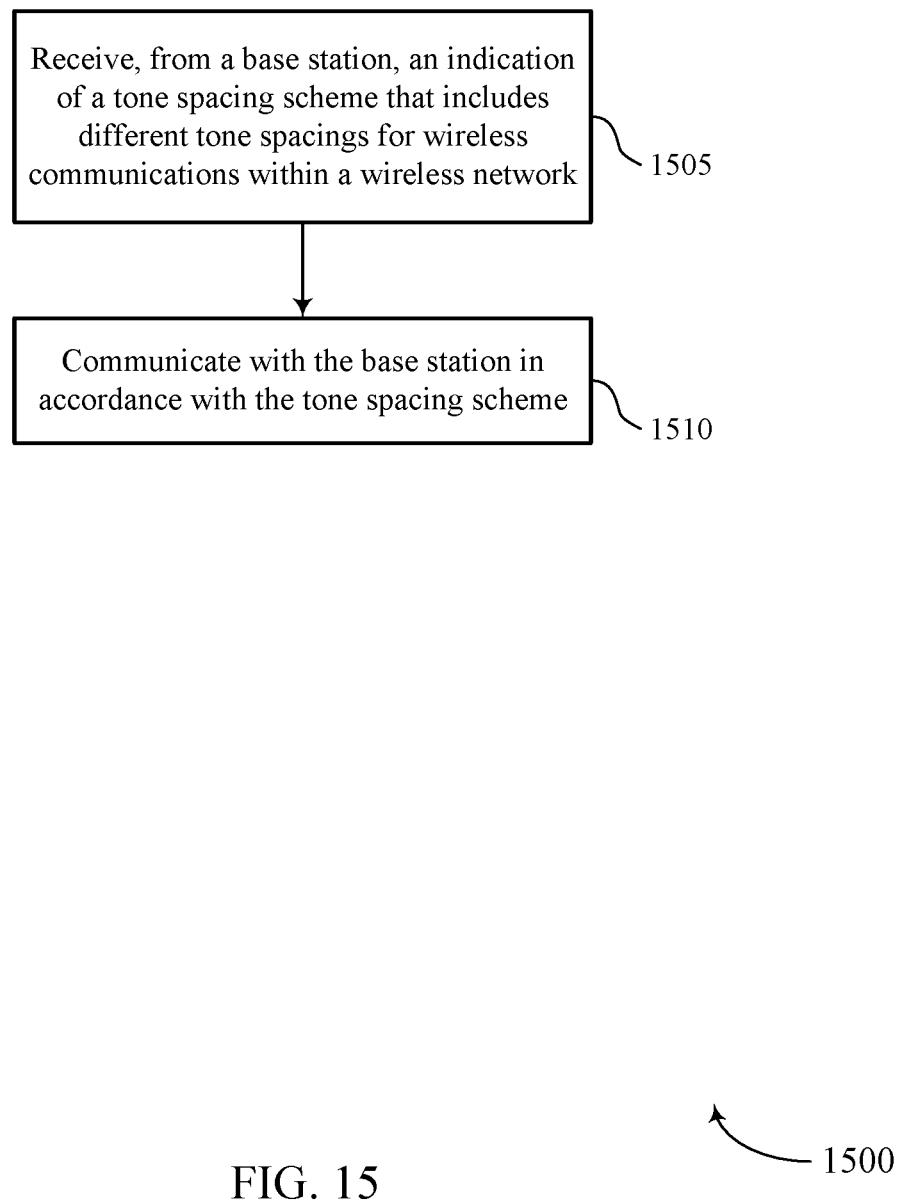

FIG. 15 shows a flowchart illustrating a method 1500 for different numerology for signal transmission in accordance with various aspects of the present disclosure. The operations of method 1500 may be implemented by a UE 115 or its components as described herein. For example, the operations of method 1500 may be performed by a UE transmission numerology manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1505, the UE 115 may receive, from a base station, an indication of a tone spacing scheme that includes different tone spacings for wireless communications within a wireless network. The operations of block 1505 may be performed according to the methods described with reference to FIGS. 1 through 4. In certain examples, aspects of the operations of block 1505 may be performed by a spacing indication component as described with reference to FIGS. 9 through 12.

At block 1510, the UE 115 may communicate with the base station in accordance with the tone spacing scheme. The operations of block 1510 may be performed according to the methods described with reference to FIGS. 1 through 4. In certain examples, aspects of the operations of block 1510 may be performed by a communication component as described with reference to FIGS. 9 through 12. For example, the UE 115 may communicate with the base station using one or more different tone spacings for each type of different wireless communication channel types in accordance with the identified tone spacing scheme. The operations of block 1515 may be performed according to the methods described with reference to FIGS. 1 through 4. In certain examples, aspects of the operations of block 1515 may be performed by a channel spacing component as described with reference to FIGS. 9 through 12.

Figure 16:
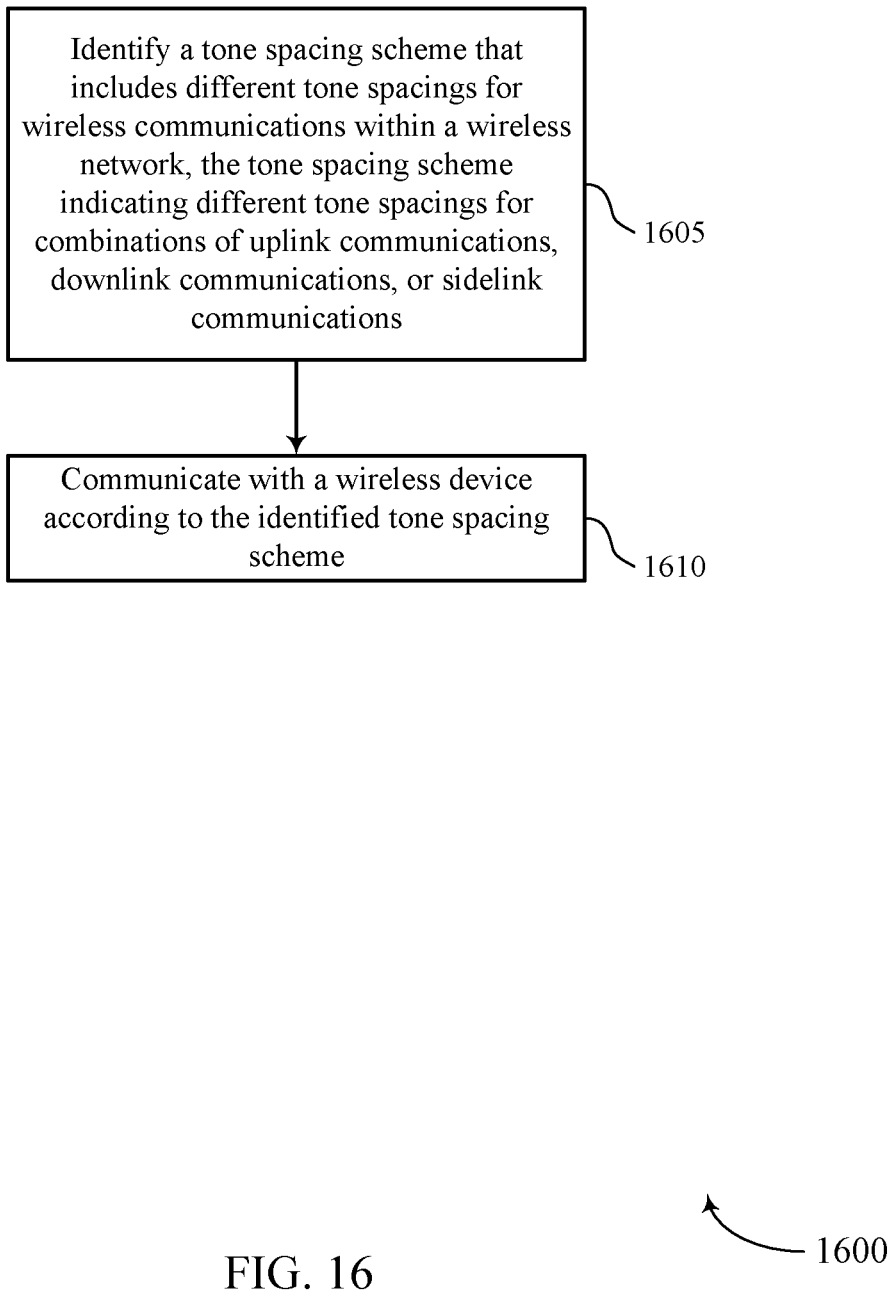

FIG. 16 shows a flowchart illustrating a method 1600 for different numerology for signal transmission in accordance with various aspects of the present disclosure. The operations of method 1600 may be implemented by a wireless device such as a base station 105, a UE 115, or their components as described herein. For example, the operations of method 1600 may be performed by a base station transmission numerology manager or a UE transmission numerology manager as described with reference to FIGS. 5 through 12. In some examples, a wireless device may execute a set of codes to control the functional elements of the device to perform the functions described below. Additionally or alternatively, the wireless device may perform aspects of the functions described below using special-purpose hardware.

At block 1605, the wireless device may identify a tone spacing scheme that includes different tone spacings for wireless communications within a wireless network, the tone spacing scheme indicating different tone spacings for combinations of uplink communications, downlink communications, or sidelink communications. The operations of block 1605 may be performed according to the methods described with reference to FIGS. 1 through 4. In certain examples, aspects of the operations of block 1605 may be performed by a tone spacing component as described with reference to FIGS. 6 and 7 or a spacing indication component as described with reference to FIGS. 10 and 11.

At block 1610, the wireless device may communicate with another wireless device (e.g., a different base station 105 or UE 115) according to the identified tone spacing scheme. The operations of block 1610 may be performed according to the methods described with reference to FIGS. 1 through 4. In certain examples, aspects of the operations of block 1610 may be performed by a spacing indication component as described with reference to FIGS. 6 and 7 or a communication component as described with reference to FIGS. 10 and 11.

Figure 17:
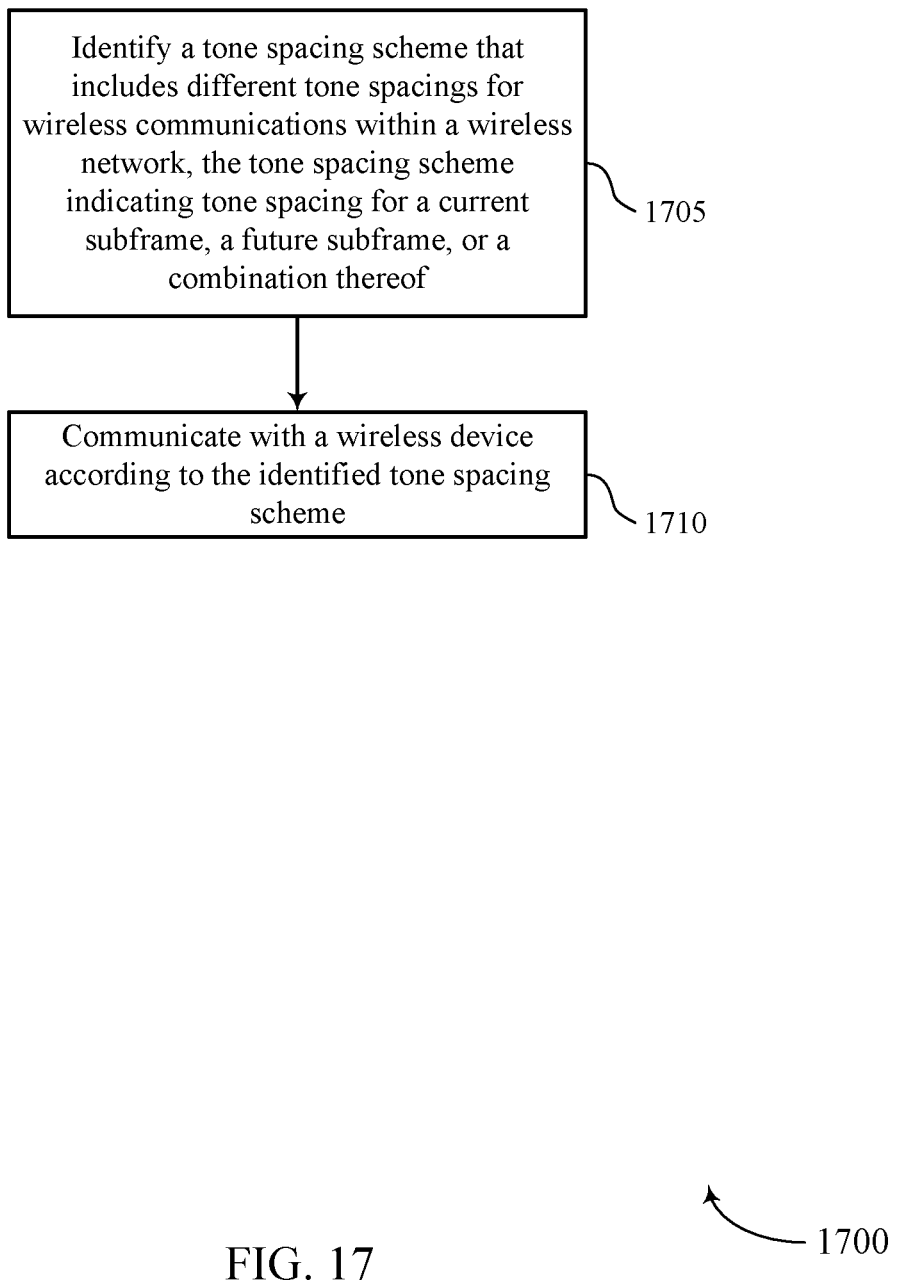

FIG. 17 shows a flowchart illustrating a method 1700 for different numerology for signal transmission in accordance with various aspects of the present disclosure. The operations of method 1700 may be implemented by a wireless device such as a base station 105, a UE 115, or their components as described herein. For example, the operations of method 1700 may be performed by a base station transmission numerology manager or a UE transmission numerology manager as described with reference to FIGS. 5 through 12. In some examples, a wireless device may execute a set of codes to control the functional elements of the device to perform the functions described below. Additionally or alternatively, the wireless device may perform aspects of the functions described below using special-purpose hardware.

At block 1705, the wireless device may identify a tone spacing scheme that includes different tone spacings for wireless communications within a wireless network, the tone spacing scheme indicating tone spacing for a current subframe, a future subframe, or a combination thereof. The operations of block 1705 may be performed according to the methods described with reference to FIGS. 1 through 4. In certain examples, aspects of the operations of block 1705 may be performed by a tone spacing component as described with reference to FIGS. 6 and 7 or a spacing indication component as described with reference to FIGS. 10 and 11.

At block 1710, the wireless device may communicate with another wireless device (e.g., a different base station 105 or UE 115) according to the identified tone spacing scheme. The operations of block 1710 may be performed according to the methods described with reference to FIGS. 1 through 4. In certain examples, aspects of the operations of block 1710 may be performed by a spacing indication component as described with reference to FIGS. 6 and 7 or a communication component as described with reference to FIGS. 10 and 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a tone spacing scheme that includes different tone spacings for different stages of wireless communications, the tone spacing scheme indicating a plurality of frequency bands associated with a new radio network, wherein each frequency band of the plurality of frequency bands is associated with one or more respective tone spacings for synchronization signals, the one or more respective tone spacings for synchronization signals being different from a tone spacing for other channels of communications; and
    communicating with a wireless device according to the identified tone spacing scheme.

2. The method of claim 1, wherein identifying the tone spacing scheme comprises:
    identifying the tone spacing scheme from a plurality of available tone spacing schemes, wherein each available tone spacing scheme of the plurality is associated with a different frequency band.

3. The method of claim 1, wherein communicating with the wireless device comprises:
    using one or more different tone spacings for each stage of the different stages of wireless communications in accordance with the identified tone spacing scheme.

4. The method of claim 3, wherein communicating with the wireless device comprises:
    participating in a random access channel (RACH) procedure with the wireless device in accordance with the identified tone spacing scheme, wherein a tone spacing for the RACH procedure is different from a tone spacing for data communications with the wireless device.

5. The method of claim 3, wherein communicating with the wireless device comprises:
    participating in data communications with the wireless device in accordance with the identified tone spacing scheme using a data channel, wherein a tone spacing for the data communications using the data channel is different from a tone spacing for other stages or channels of communication with the wireless device.

6. The method of claim 1, wherein communicating with the wireless device comprises:
    communicating with the wireless device using one or more different tone spacings for each type of different wireless communication channel types in accordance with the identified tone spacing scheme, wherein the different wireless communication channel types comprise a random access channel type, an uplink control channel type, an uplink shared channel type, a downlink control channel type, a downlink shared channel type, or combinations thereof.

7. The method of claim 6, wherein communicating with the wireless device comprises:
communicating via one or more control channels with the wireless device in accordance with the identified tone spacing scheme, wherein a tone spacing for the one or more control channels is different from a tone spacing for other types of communication with the wireless device, the other types of communication comprising one or more shared channels or data channels.

8. The method of claim 1, wherein:
the identified tone spacing scheme indicates different tone spacings for uplink communications, downlink communications, sidelink communications, or combinations thereof.

9. The method of claim 1, wherein:
the synchronization signals comprise a primary synchronization signal (PSS), a secondary synchronization signal (SSS), a physical broadcast channel (PBCH), an extended synchronization signal (ESS), or combinations thereof.

10. The method of claim 1, wherein:
the tone spacing of at least one synchronization signal of the synchronization signals is different from at least one other synchronization signal, wherein the at least one other synchronization signal comprises a primary synchronization signal (PSS), a secondary synchronization signal (SSS), a physical broadcast channel (PBCH), an extended synchronization signal (ESS), or combinations thereof.

11. The method of claim 1, wherein identifying the tone spacing scheme comprises:
receiving an indication of the identified tone spacing scheme via a synchronization channel, a control channel, a physical broadcast channel (PBCH), a radio resource control (RRC) message, a master information block (MIB), a system information block (SIB), or combinations thereof.

12. The method of claim 11, wherein:
the SIB comprises minimum system information or other system information.

13. The method of claim 1, wherein identifying the tone spacing scheme comprises:
identifying the tone spacing scheme via a characteristic of a primary synchronization signal (PSS), a secondary synchronization signal (SSS), an extended synchronization signal (ESS), a reference signal, or combinations thereof.

14. The method of claim 13, wherein the characteristic comprises a number of repetitions, a number of tones, a pattern of tones, or combinations thereof.

15. The method of claim 1, wherein identifying the tone spacing scheme comprises:
identifying the tone spacing scheme for either a current subframe or a future subframe for communications with the wireless device.

16. The method of claim 1, further comprising:
receiving an indication of a second tone spacing for an additional frequency band associated with communications with the wireless device; and
communicating with the wireless device according to the second tone spacing.

17. An apparatus for wireless communication at a user equipment (UE), comprising:
a processor;
memory coupled with the processor; and
instructions stored in the memory and executable by the processor, to cause the apparatus to:
identify a tone spacing scheme that includes different tone spacings for different stages of wireless communications, the tone spacing scheme indicating a plurality of frequency bands associated with a new radio network, wherein each frequency band of the plurality of frequency bands is associated with one or more respective tone spacings for synchronization signals, the one or more respective tone spacings for synchronization signals being different from a tone spacing for other channels of communications; and
communicate with a wireless device according to the identified tone spacing scheme.

18. The apparatus of claim 17, wherein the instructions are further executable by the processor to:
identify the tone spacing scheme from a plurality of available tone spacing schemes, wherein each available tone spacing scheme of the plurality is associated with a different frequency band.

19. The apparatus of claim 17, wherein the instructions are further executable by the processor to:
use one or more different tone spacings for each stage of the different stages of wireless communications in accordance with the identified tone spacing scheme.

20. The apparatus of claim 19, wherein the instructions are further executable by the processor to:
participate in a random access channel (RACH) procedure with the wireless device in accordance with the identified tone spacing scheme, wherein a tone spacing for the RACH procedure is different from a tone spacing for data communications with the wireless device.

21. The apparatus of claim 19, wherein the instructions are further executable by the processor to:
participate in data communications with the wireless device in accordance with the identified tone spacing scheme using a data channel, wherein a tone spacing for the data communications using the data channel is different from a tone spacing for other stages or channels of communication with the wireless device.

22. The apparatus of claim 17, wherein the instructions are further executable by the processor to:
communicate with the wireless device using one or more different tone spacings for each type of different wireless communication channel types in accordance with the identified tone spacing scheme, wherein the different wireless communication channel types comprise a random access channel type, an uplink control channel type, an uplink shared channel type, a downlink control channel type, a downlink shared channel type, or combinations thereof.

23. The apparatus of claim 22, wherein the instructions are further executable by the processor to:
communicate via one or more control channels with the wireless device in accordance with the identified tone spacing scheme, wherein a tone spacing for the one or more control channels is different from a tone spacing for other types of communication with the wireless device, the other types of communication comprising one or more shared channels or data channels.

24. The apparatus of claim 17, wherein:
the identified tone spacing scheme indicates different tone spacings for uplink communications, downlink communications, sidelink communications, or combinations thereof.

25. The apparatus of claim 17, wherein:
the synchronization signals comprise a primary synchronization signal (PSS), a secondary synchronization signal (SSS), a physical broadcast channel (PBCH), an extended synchronization signal (ESS), or combinations thereof.

26. The apparatus of claim 17, wherein:
the tone spacing of at least one synchronization signal of the synchronization signals is different from at least one other synchronization signal, wherein the at least one other synchronization signal comprises a primary synchronization signal (PSS), a secondary synchronization signal (SSS), a physical broadcast channel (PBCH), an extended synchronization signal (ESS), or combinations thereof.

27. The apparatus of claim 17, wherein the instructions are further executable by the processor to:
receive an indication of the identified tone spacing scheme via a synchronization channel, a control channel, a physical broadcast channel (PBCH), a radio resource control (RRC) message, a master information block (MIB), a system information block (SIB), or combinations thereof.

28. The apparatus of claim 27, wherein:
the SIB comprises minimum system information or other system information.

29. The apparatus of claim 17, wherein the instructions are further executable by the processor to:
identify the tone spacing scheme via a characteristic of a primary synchronization signal (PSS), a secondary synchronization signal (SSS), an extended synchronization signal (ESS), a reference signal, or combinations thereof.

30. The apparatus of claim 29, wherein the characteristic comprises a number of repetitions, a number of tones, a pattern of tones, or combinations thereof.

31. The apparatus of claim 17, wherein the instructions are further executable by the processor to:
identify the tone spacing scheme for either a current subframe or a future subframe for communications with the wireless device.

32. The apparatus of claim 17, wherein the instructions are further executable by the processor to:
receive an indication of a second tone spacing for an additional frequency band associated with communications with the wireless device; and
communicate with the wireless device according to the second tone spacing.

33. An apparatus for wireless communication at a user equipment (UE), comprising:
means for identifying a tone spacing scheme that includes different tone spacings for different stages of for wireless communications, the tone spacing scheme indicating a plurality of frequency bands associated with a new radio network, wherein each frequency band of the plurality of frequency bands is associated with one or more respective tone spacings for synchronization signals, the one or more respective tone spacings for synchronization signals being different from a tone spacing for other channels of communications; and
means for communicating with a wireless device according to the identified tone spacing scheme.

34. The apparatus of claim 33, wherein the means for identifying the tone spacing scheme comprises:
means for identifying the tone spacing scheme from a plurality of available tone spacing schemes, wherein each available tone spacing scheme of the plurality is associated with a different frequency band.

35. The apparatus of claim 33, wherein the means for communicating with the wireless device comprises:
means for using one or more different tone spacings for each stage of the different stages of wireless communications in accordance with the identified tone spacing scheme.

36. The apparatus of claim 35, wherein the means for communicating with the wireless device comprises:
means for participating in a random access channel (RACH) procedure with the wireless device in accordance with the identified tone spacing scheme, wherein a tone spacing for the RACH procedure is different from a tone spacing for data communications with the wireless device.

37. The apparatus of claim 35, wherein the means for communicating with the wireless device comprises:
means for participating in data communications with the wireless device in accordance with the identified tone spacing scheme using a data channel, wherein a tone spacing for the data communications using the data channel is different from a tone spacing for other stages or channels of communication with the wireless device.

38. The apparatus of claim 33, wherein the means for communicating with the wireless device comprises:
means for communicating with the wireless device using one or more different tone spacings for each type of different wireless communication channel types in accordance with the identified tone spacing scheme, wherein the different wireless communication channel types comprise a random access channel type, an uplink control channel type, an uplink shared channel type, a downlink control channel type, a downlink shared channel type, or combinations thereof.

39. The apparatus of claim 38, wherein the means for communicating with the wireless device comprises:
means for communicating via one or more control channels with the wireless device in accordance with the identified tone spacing scheme, wherein a tone spacing for the one or more control channels is different from a tone spacing for other types of communication with the wireless device, the other types of communication comprising one or more shared channels or data channels.

40. The apparatus of claim 33, wherein the identified tone spacing scheme indicates different tone spacings for uplink communications, downlink communications, sidelink communications, or combinations thereof.

41. The apparatus of claim 33, wherein the synchronization signals comprise a primary synchronization signal (PSS), a secondary synchronization signal (SSS), a physical broadcast channel (PBCH), an extended synchronization signal (ESS), or combinations thereof.

42. The apparatus of claim 33, wherein the tone spacing of at least one synchronization signal of the synchronization signals is different from at least one other synchronization signal, wherein the at least one other synchronization signal comprises a primary synchronization signal (PSS), a secondary synchronization signal (SSS), a physical broadcast channel (PBCH), an extended synchronization signal (ESS), or combinations thereof.

43. The apparatus of claim 33, wherein the means for identifying the tone spacing scheme comprises:
means for receiving an indication of the identified tone spacing scheme via a synchronization channel, a control channel, a physical broadcast channel (PBCH), a radio resource control (RRC) message, a master information block (MIB), a system information block (SIB), or combinations thereof.

44. The apparatus of claim 43, wherein the SIB comprises minimum system information or other system information.

45. The apparatus of claim 33, wherein the means for identifying the tone spacing scheme comprises:
means for identifying the tone spacing scheme via a characteristic of a primary synchronization signal (PSS), a secondary synchronization signal (SSS), an extended synchronization signal (ESS), a reference signal, or combinations thereof.

46. The apparatus of claim 45, wherein the characteristic comprises a number of repetitions, a number of tones, a pattern of tones, or combinations thereof.

47. The apparatus of claim 33, wherein the means for identifying the tone spacing scheme comprises:
means for identifying the tone spacing scheme for either a current subframe or a future subframe for communications with the wireless device.

48. A non-transitory computer-readable medium storing code for wireless communication at a user equipment (UE), the code comprising instructions executable by a processor to:
identify a tone spacing scheme that includes different tone spacings for different stages of wireless communications, the tone spacing scheme indicating a plurality of frequency bands associated with a new radio network, wherein each frequency band of the plurality of frequency bands is associated with one or more respective tone spacings for synchronization signals, the one or more respective tone spacings for synchronization signals being different from a tone spacing for other channels of communications; and
communicate with a wireless device according to the identified tone spacing scheme.

* * * * *